United States Patent
Kavantsaari

(10) Patent No.: US 10,701,540 B2
(45) Date of Patent: Jun. 30, 2020

(54) METHOD AND AN APPARATUS FOR CONTROLLING AN EMERGENCY COMMUNICATION

(71) Applicant: GuardianX Technologies Oy, Helsinki (FI)

(72) Inventor: Marc-Johann Kavantsaari, Helsinki (FI)

(73) Assignee: GuardianX Technologies Oy, Helsinki (FI)

( * ) Notice: Subject to any disclaimer, the term of this patent is extended or adjusted under 35 U.S.C. 154(b) by 0 days.

(21) Appl. No.: 16/087,691

(22) PCT Filed: Mar. 24, 2017

(86) PCT No.: PCT/FI2017/050211
§ 371 (c)(1),
(2) Date: Sep. 24, 2018

(87) PCT Pub. No.: WO2017/162928
PCT Pub. Date: Sep. 28, 2017

(65) Prior Publication Data
US 2019/0110181 A1    Apr. 11, 2019

(30) Foreign Application Priority Data
Mar. 24, 2016 (FI) .................................... 20165252

(51) Int. Cl.
*H04W 4/90* (2018.01)
*H04W 4/029* (2018.01)
(Continued)

(52) U.S. Cl.
CPC ............ *H04W 4/90* (2018.02); *G08B 25/001* (2013.01); *G08B 25/005* (2013.01);
(Continued)

(58) Field of Classification Search
CPC .......... H04M 11/04; H04W 4/22; H04W 4/90
See application file for complete search history.

(56) References Cited

U.S. PATENT DOCUMENTS

2007/0030144 A1   2/2007  Titus et al.
2008/0267360 A1*  10/2008  Spector ............. H04M 3/42348
                                                                379/45
(Continued)

FOREIGN PATENT DOCUMENTS

CA       2900204 A1    2/2016

OTHER PUBLICATIONS

Finnish Patent Office, Search report dated Aug. 17, 2016 in a Finnish patent application No. 20165252.

*Primary Examiner* — Myron Wyche
(74) *Attorney, Agent, or Firm* — Berggren LLP

(57) ABSTRACT

According to an aspect, there is provided a method and an apparatus for controlling an emergency communication. A signal indicating an emergency relating to a user of a user device is detected. A search is performed for valid recipients for an emergency communication relating to the emergency, a valid recipient being determined based at least on online status of the recipient and/or spatial and/or temporal distance between the user and the valid recipient. At least one valid recipient found in the search is selected and transmission of the emergency communication is caused to at least one user device corresponding to the at least one selected valid recipient.

23 Claims, 21 Drawing Sheets

(51) Int. Cl.
*G08B 25/00* (2006.01)
*G08B 25/01* (2006.01)
*H04W 4/02* (2018.01)
*H04L 29/08* (2006.01)
*H04W 4/021* (2018.01)

(52) U.S. Cl.
CPC ............ *G08B 25/016* (2013.01); *H04L 67/18* (2013.01); *H04L 67/24* (2013.01); *H04W 4/02* (2013.01); *H04W 4/021* (2013.01); *H04W 4/023* (2013.01); *H04W 4/029* (2018.02)

(56) References Cited

U.S. PATENT DOCUMENTS

| | | | |
|---|---|---|---|
| 2009/0227224 A1 | 9/2009 | Aftelak et al. | |
| 2011/0117878 A1* | 5/2011 | Barash | H04W 4/90 455/404.2 |
| 2012/0171983 A1* | 7/2012 | Eitel | H04M 11/04 455/404.1 |
| 2012/0282887 A1* | 11/2012 | Khoo | G08G 1/205 455/404.2 |
| 2015/0317356 A1* | 11/2015 | Deichler | G06Q 10/10 707/760 |
| 2015/0332581 A1 | 11/2015 | Gaurav et al. | |
| 2016/0157074 A1* | 6/2016 | Joao | G06F 16/29 455/404.2 |
| 2016/0192166 A1* | 6/2016 | Decharms | H04W 4/021 348/14.02 |

* cited by examiner

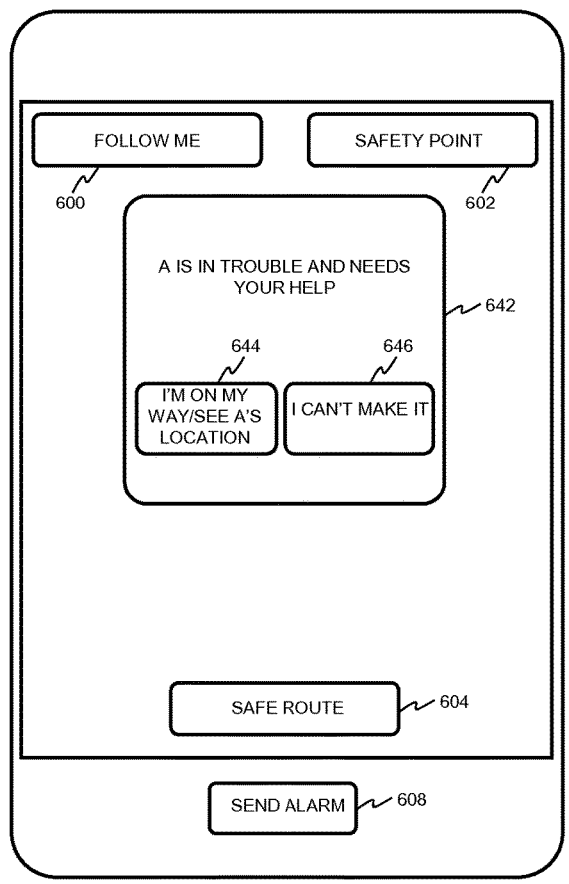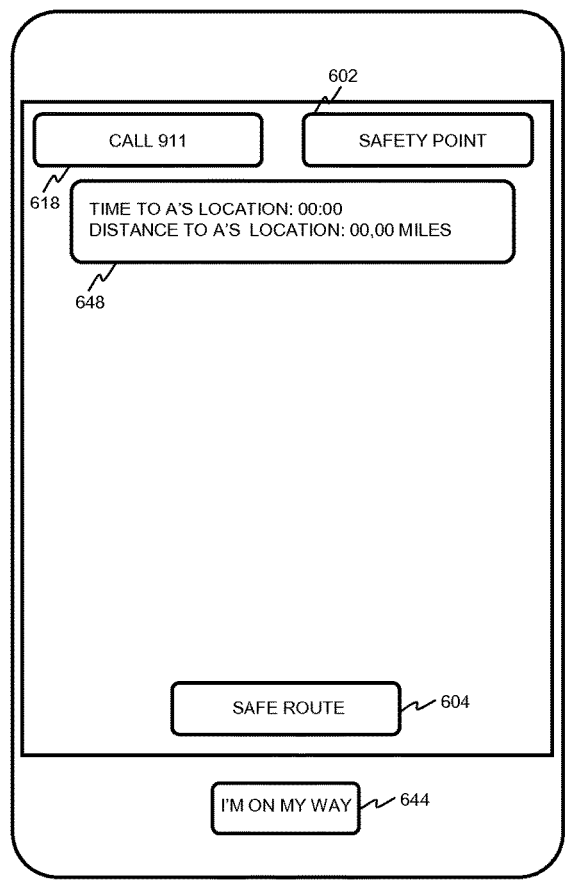
FIG. 6I
FIG. 6J

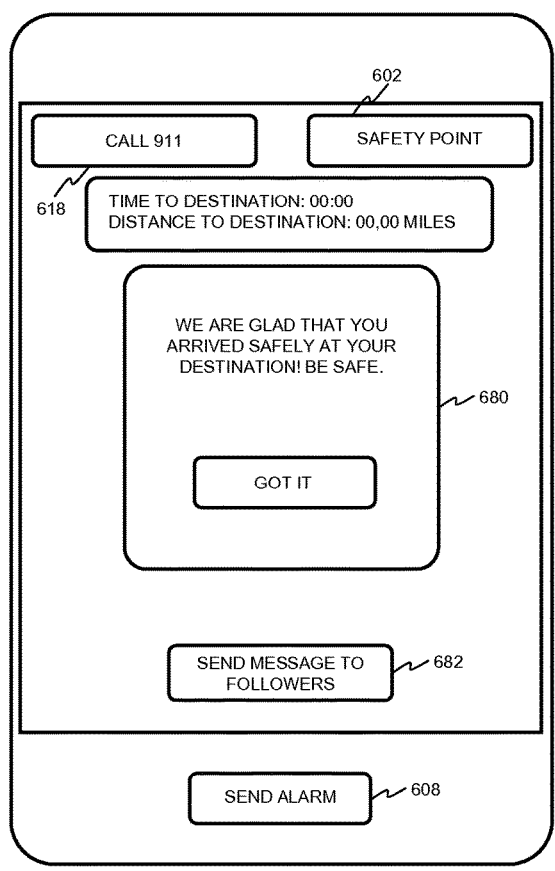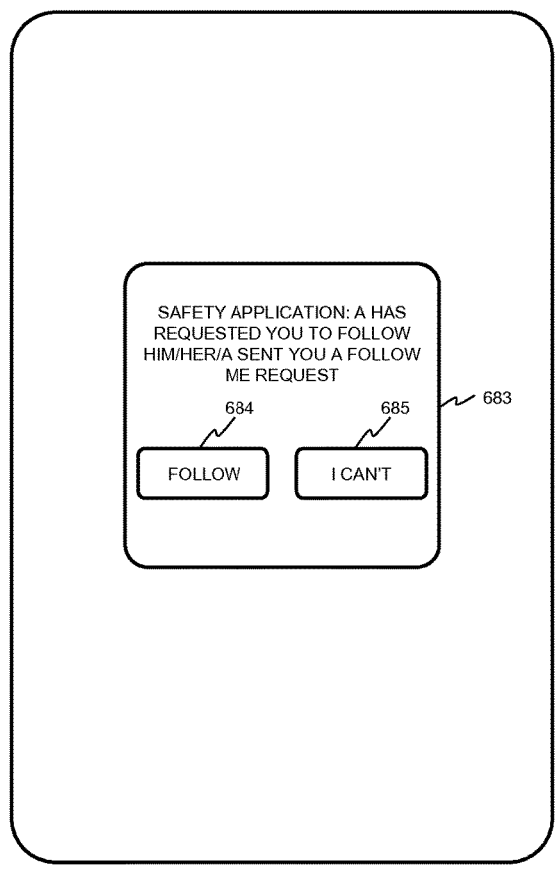
FIG. 6U                    FIG. 6V

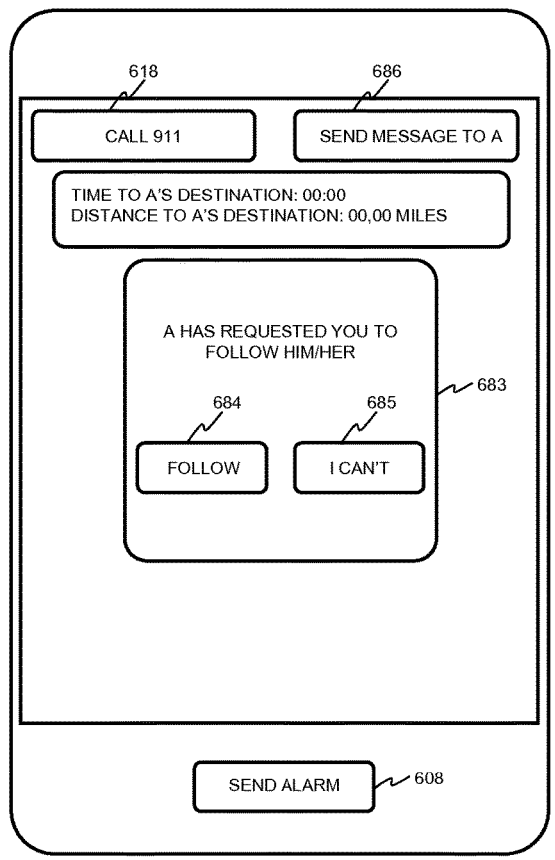
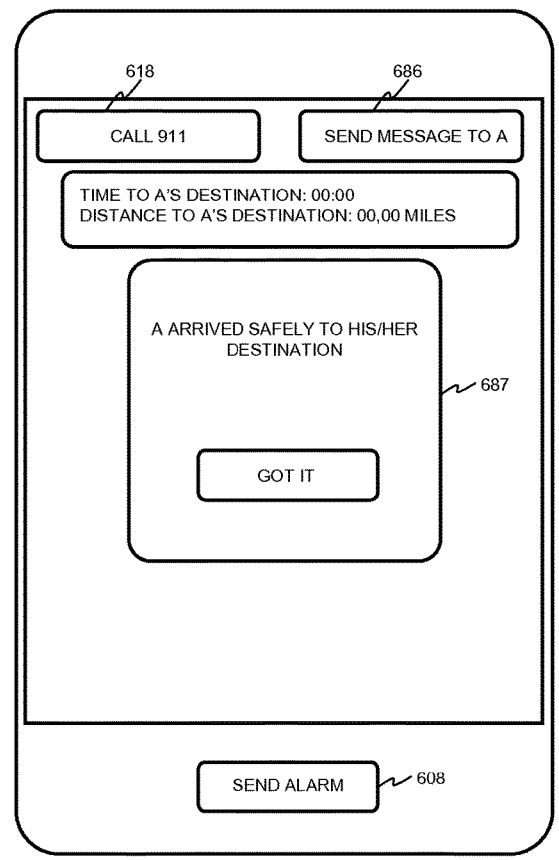
FIG. 6W                    FIG. 6X

METHOD AND AN APPARATUS FOR CONTROLLING AN EMERGENCY COMMUNICATION

PRIORITY

This application is a U.S. national application of the international application number PCT/FI2017/050211 filed on 24 Mar. 2017, which claims priority of Finnish application FI20165252 filed on Mar. 24, 2016, the contents of all of which are incorporated herein by reference.

BACKGROUND

Emergency alarms, signals or emergency communication are generally sent through traditional methods, such as telephone calls, short messages or through other forms of traditional technical telecommunication solutions and they generally include a certain form of communication between an individual and a governmental or emergency authority. Emergency alarms, signals and any other emergency communication are often sent out in situations of distress where individuals experience threatening circumstances or danger. Such emergency communication generally occurs between an individual and an authority or official who is responsible of receiving the communication and organizing assistance and help accordingly either through private or governmental organizations and instances that have a responsibility to react and take action in order to help and protect individuals and organizations in emergency situations. The private or governmental organizations and instances comprise, for example, police, fire department, private security firms or any other form of private or governmental organizations.

Emergency communication may also occur between private actors and individuals and does not exclude communication either through offline or online solutions, telecommunication technology or any other form of possible (emergency) communication. Emergency communication may be any communication including any form of alarms, signals or communication communicated or sent out in situations of distress or in a threatening situation. Such communication may be communicated, for example, by telecommunication solutions such as a phone call, a short message or through email, Internet or other network and they may be received by both private and governmental actors.

Emergency communication may also occur entirely online, for example, using a website, platform or network accessible via the Internet or through a software application. A sending party may communicate an emergency and allow one or several receiving parties to receive and react to it. Such emergency communication happens generally through a network connection, either wireless or non-wireless. The communication generally includes an emergency message, alarm or signal in form of a voice or video message or in a written format.

SUMMARY

According to a first aspect, there is provided a method for controlling an emergency communication. The method comprises detecting, by at least one processing unit, a signal indicating an emergency relating to a user of a user device; searching, by the at least one processing unit, for valid recipients for an emergency communication relating to the emergency, a valid recipient being determined based at least on preferably online status of the recipient and/or the spatial and/or temporal distance between the user device and a recipient device of the valid recipient; selecting, by the at least one processing unit, at least one valid recipient found in the search; and causing, by the at least one processing unit, transmission of the emergency communication to a recipient device corresponding to the at least one selected valid recipient.

In one embodiment, the method further comprises directing the search to one of the following: all online recipients, online recipients with the most recent online timestamp, and/or online recipients having the most recent location within a predetermined spatial and/or temporal distance from the user device.

In one embodiment, alternatively or in addition, the method further comprises directing the search to one of the following: all offline recipients, offline recipients with the most recent online timestamp, and/or offline recipients having the most recent location within a predetermined spatial and/or temporal distance from the user device.

In one embodiment, alternatively or in addition, the method further comprises directing the search to offline recipients that are most probably within a predetermined minimum or maximum spatial and/or temporal distance from the user device based on statistical or any other amount of online activity from a specific location or address.

In one embodiment, alternatively or in addition, the valid recipient being determined based on a predetermined spatial and/or temporal maximum distance between the user device and the recipient device.

In one embodiment, alternatively or in addition, the method further comprises one of the following: continuously updating the search results; updating the search results after a search timer expires or after a certain time limit; updating the search results when a new valid recipient needs to be selected; and/or performing a single search in response to receiving the signal indicating the emergency, the search results of the single search comprising a predetermined number of valid recipients.

In one embodiment, alternatively or in addition, the method further comprises organizing, by the at least one processing unit, the at least one valid recipient found in the search according to the shortest spatial and/or temporal distance between the user device and the recipient device of each valid recipient; and selecting, by the at least one processing unit, the at least one valid recipient based on the organized search.

In one embodiment, alternatively or in addition, the method further comprises organizing, by the at least one processing unit, the at least one valid recipient found in the search according to most recent online timestamp; and selecting, by the at least one processing unit, the at least one valid recipient based on the organized search.

In one embodiment, alternatively or in addition, the method further comprises organizing, by the at least one processing unit, the at least one valid recipient found in the search based on the shortest spatial and/or temporal distance between the user device and the recipient device of each valid recipient and the most recent online timestamp; and selecting, by the at least one processing unit, the at least one valid recipient based on the organized search.

In one embodiment, alternatively or in addition, the method further comprises organizing, by the at least one processing unit, the online recipients found in the search according to the most recent online time stamp and the shortest spatial and/or temporal distance between the user device and the latest location of an online recipient device of an online recipient; and selecting, by the at least one processing unit, the at least valid recipient based on the organized search.

In one embodiment, alternatively or in addition, the method further comprises firstly organizing, by the at least one processing unit, the online recipients found in the search according to the most recent online time stamp or the shortest spatial and/or temporal distance between the user device and the latest location of an online recipient device of an online recipient; secondly organizing, by the at least one processing unit, the online recipients according to the shortest spatial and/or temporal distance between the user device and the latest location of an online recipient device of an online recipient or the most recent online time stamp; and selecting, by the at least one processing unit, the at least one valid recipient based on the organized search.

In one embodiment, alternatively or in addition, the method further comprises maintaining the number of selected valid recipients to which the emergency communication has been sent within a predetermined minimum or maximum number of selected valid recipients.

In one embodiment, alternatively or in addition, the method further comprises selecting a predetermined number of new valid recipients when a timer expires, after a certain time limit and/or when the number of arrived and/or acknowledged recipients has not reached a predetermined maximum limit or a predetermined minimum limit.

In one embodiment, alternatively or in addition, the method further comprises determining, by the at least one processing unit, that no acknowledgement has been received within a recipient specific acknowledgement time limit from a selected valid recipient to which the emergency communication was caused to be sent; deselecting the previously selected valid recipient from which no acknowledgement has been received within a recipient specific acknowledgement time limit; selecting, by the at least one processing unit, a new valid recipient; and causing, by the at least one processing unit, transmission of the emergency communication to a recipient device corresponding to the selected new valid recipient.

In one embodiment, alternatively or in addition, the method further comprises determining, by the at least one processing unit, that a recipient device of a recipient is within a predetermined spatial and/or temporal minimum distance from the user device; and excluding, by the at least one processing unit, the recipient from the search for and/or selection of valid recipients.

In one embodiment, alternatively or in addition, the method further comprises determining, by the at least one processing unit, that a group of recipients is within a predetermined spatial and/or temporal minimum distance from the user; and enabling, by the at least one processing unit, selecting only a subgroup of the group of recipients or excluding the group of recipients as a whole when searching and/or selecting the at least one selected valid recipient.

In one embodiment, alternatively or in addition, the method further comprises stopping the searching, selecting and/or transmitting when at least one of the following is fulfilled: the number of acknowledged and/or arrived recipients reaches a predetermined maximum limit or a predetermined minimum limit; no new valid recipients are available; no Internet connection is available for the user device; the user of the user device cannot be located; and the user of the user device has provided a confirmation that the user is safe.

In one embodiment, alternatively or in addition, the method further comprises determining, by the at least one processing unit, at least one of the following: no new valid online recipients are available; a general timer started when the emergency communication was transmitted to a first selected valid recipient has expired or a certain time limit has expired; and the number of acknowledged and/or arrived recipients has not reached a predetermined maximum limit or a predetermined minimum limit; selecting at least one offline recipient; and causing transmission of the emergency communication to an offline recipient device corresponding to the at least one selected offline recipient.

In one embodiment, alternatively or in addition, the method further comprises organizing, by the at least one processing unit, the offline recipients found in the search according to the most recent online time stamp; and selecting, by the at least one processing unit, the at least one offline recipient based on the organized search.

In one embodiment, alternatively or in addition, the method further comprises organizing, by the at least one processing unit, the offline recipients found in the search according to the shortest spatial and/or temporal distance between the user device and the latest location of an offline recipient device of an offline recipient; and selecting, by the at least one processing unit, the at least one offline recipient based on the organized search.

In one embodiment, alternatively or in addition, the method further comprises organizing, by the at least one processing unit, the offline recipients found in the search according to the most recent online time stamp and the shortest spatial and/or temporal distance between the user device and the latest location of an offline recipient device of an offline recipient; and selecting, by the at least one processing unit, the at least one offline recipient based on the organized search.

In one embodiment, alternatively or in addition, the method further comprises firstly organizing, by the at least one processing unit, the offline recipients found in the search according to the most recent online time stamp or the shortest spatial and/or temporal distance between the user device and the latest location of an offline recipient device of an offline recipient; secondly organizing, by the at least one processing unit, the offline recipients according to the shortest spatial and/or temporal distance between the user device and the latest location of an offline recipient device of an offline recipient or the most recent online time stamp; and selecting, by the at least one processing unit, the at least one offline recipient based on the organized search.

In one embodiment, alternatively or in addition, the method further comprises determining, by the at least one processing unit, at least one of the following: no new valid online recipients are available; a general timer started when the emergency communication was transmitted to a first selected valid recipient has expired or certain time limit has expired; and the number of acknowledged and/or arrived recipients has not reached a predetermined maximum limit or a predetermined minimum limit; determining, by the at least one processing unit, offline recipients that are most probably within a predetermined spatial and/or temporal minimum or maximum distance from the user device based on statistical or any other amount of online activity from a specific location or address; selecting at least one most probable offline recipient; and causing transmission of the emergency communication to an offline recipient device corresponding to the at least one selected most probable offline recipient.

In one embodiment, alternatively or in addition, the method further comprises initiating, by the at least one processing unit, a canceling timer; providing, by the at least one processing unit, the canceling timer via a user interface to the user; and canceling, by the at least one processing unit, the emergency communication if receiving a cancel confirmation from the user before the canceling timer expires.

In one embodiment, alternatively or in addition, the method further comprises delaying, by the at least one processing unit, the transmission of the emergency communication to the recipient device corresponding to the at least one selected valid recipient by a delay time amount after receiving the signal indicating the emergency relating to the user of the user device; and causing, by the at least one processing unit, transmission of the emergency communication to the recipient device corresponding to the at least one selected valid recipient if receiving no cancel confirmation from the user during the delay time amount.

In one embodiment, alternatively or in addition, the method further comprises enabling, by the at least one processing unit, the user to provide a safety confirmation (indication) via a user interface of the user device; and terminating, by the at least one processing unit, the emergency communication when receiving the safety confirmation.

In one embodiment, alternatively or in addition, the method further comprises determining, by the at least one processing unit, that the user has reached a safety point or a predetermined destination or that a valid recipient has reached the user's location; enabling, by the at least one processing unit, the user to provide a safety confirmation via a user interface of the user device; and terminating, by the at least one processing unit, the emergency communication when receiving the safety confirmation.

In one embodiment, alternatively or in addition, the method further comprises determining, by the at least one processing unit, that the user has reached a safety point or a predetermined destination or that a valid recipient has reached the user's location; and terminating, by the at least one processing unit, the emergency communication.

In one embodiment, alternatively or in addition, the method further comprises causing, by the at least one processing unit, transmission of the emergency communication to at least one primary contact in addition to causing transmission of the emergency communication to the at least one valid recipient.

In one embodiment, alternatively or in addition, the method further comprises indicating, by the at least one processing unit, in the emergency communication to the recipient device corresponding to the at least one selected valid online recipient or offline recipient that the recipient device is to delay the display of the emergency communication to the recipient by a delay time amount.

In one embodiment, alternatively or in addition, the method further comprises detecting, by the at least one processing unit, a deviation from an expected behavior of the user; and initiating, by the at least one processing unit, the signal indicating the emergency relating to the user of the user device.

In one embodiment, alternatively or in addition, the method further comprises requesting, by the at last one processing unit, a safety confirmation from the user after detecting the deviation from the expected behavior of the user; and automatically initiating, by the at least one processing unit, the signal indicating the emergency relating to the user of the user device when receiving no confirmation from the user within a predetermined time limit.

In one embodiment, alternatively or in addition, the deviation from the expected behavior comprises at least one of the following: deviation from an expected and/or predetermined route; acceleration or deceleration; a missed estimated time of arrival; an increase in the estimated time of arrival; distance to/from a predetermined location; detected strange, deviant or unexpected movement by the user; detected strange, deviant, unexpected movement by the user device or directed to the user device; immobility; and a variation in body function such as an increase or a decrease in a pulse rate.

In one embodiment, alternatively or in addition, the method further comprises detecting, by the at least one processing unit, an event concerning recent, latest or present location of the user of the user device; and requesting, by the at least one processing unit, a safety confirmation from the user after detecting the event.

In one embodiment, alternatively or in addition, the method further comprises requesting, by the at least one processing unit, a safety confirmation from the user of the user device when the user reaches a predetermined location or departs from a predetermined location.

In one embodiment, alternatively or in addition, the method further comprises automatically initiating, by the at least one processing unit, the signal indicating the emergency relating to the user of the user device when receiving no confirmation from the user within a predetermined time limit.

In one embodiment, alternatively or in addition, the method further comprises causing transmission, by the at least one processing unit, of a safety confirmation when the user reaches a predetermined location or departs from a predetermined location.

According to a second aspect, there is provided a computer program product comprising program code, which when executed by an apparatus, causes the apparatus to perform the method of any of the first aspect. In one embodiment, the computer program is embodied on a computer-readable medium.

According to a third aspect, there is provided an apparatus for controlling an emergency communication. The apparatus comprises at least one processing unit and at least one memory. The at least one memory stores program instructions that, when executed by the at least one processing unit, cause the apparatus to detect a signal indicating an emergency relating to a user of a user device; search for valid recipients for an emergency communication relating to the emergency, a valid recipient being determined based at least on preferably online status of the recipient and/or spatial and/or temporal distance between the user device and a recipient device of the valid recipient; select at least one valid recipient found in the search; and cause transmission of the emergency communication to a recipient device corresponding to the at least one selected valid recipient.

In one embodiment, the at least one memory stores program instructions that, when executed by the at least one processing unit, cause the apparatus to direct the search to one of the following: all online recipients, online recipients with the most recent online timestamp, and/or online recipients having the most recent location within a predetermined spatial and/or temporal distance from the user device.

In one embodiment, alternatively or in addition, the at least one memory stores program instructions that, when executed by the at least one processing unit, cause the apparatus to direct the search to one of the following: all offline recipients, offline recipients with the most recent online timestamp, and/or offline recipients having the most recent location within a predetermined spatial and/or temporal distance from the user device.

In one embodiment, alternatively or in addition, the at least one memory stores program instructions that, when executed by the at least one processing unit, cause the apparatus to direct the search to offline recipients that are most probably within a predetermined minimum or maximum spatial and/or temporal distance from the user device based on statistical or any other amount of online activity from a specific location or address.

In one embodiment, alternatively or in addition, the valid recipient being determined based on a predetermined spatial and/or temporal maximum distance between the user device and the recipient device.

In one embodiment, alternatively or in addition, the at least one memory stores program instructions that, when executed by the at least one processing unit, cause the apparatus to perform one of the following: continuously update the search results; updating the search results after a search timer expires or after a certain time limit; update the search results when a new valid recipient needs to be selected; and/or perform a single search in response to receiving the signal indicating the emergency, the search results of the single search comprises a predetermined number of valid recipients.

In one embodiment, alternatively or in addition, the at least one memory stores program instructions that, when executed by the at least one processing unit, cause the apparatus to organize the at least one valid recipient found in the search according to the shortest spatial and/or temporal distance between the user device and the recipient device of each valid recipient; and select the at least one valid recipient based on the organized search.

In one embodiment, alternatively or in addition, the at least one memory stores program instructions that, when executed by the at least one processing unit, cause the apparatus to organize the at least one valid recipient found in the search according to most recent online timestamp; and select the at least one valid recipient based on the organized search.

In one embodiment, alternatively or in addition, the at least one memory stores program instructions that, when executed by the at least one processing unit, cause the apparatus to organize the at least one valid recipient found in the search based on the shortest spatial and/or temporal distance between the user device and the recipient device of each valid recipient and/or the most recent online timestamp; and select the at least one valid recipient based on the organized search.

In one embodiment, alternatively or in addition, the at least one memory stores program instructions that, when executed by the at least one processing unit, cause the apparatus to organize the online recipients found in the search according to the most recent online time stamp and the shortest spatial and/or temporal distance between the user device and the latest location of an online recipient device of an online recipient; and select the at least valid recipient based on the organized search.

In one embodiment, alternatively or in addition, the at least one memory stores program instructions that, when executed by the at least one processing unit, cause the apparatus to firstly organize the online recipients found in the search according to the most recent online time stamp or the shortest spatial and/or temporal distance between the user device and the latest location of an online recipient device of an online recipient; secondly organize the online recipients according to the shortest spatial and/or temporal distance between the user device and the latest location of an online recipient device of an online recipient or the most recent online time stamp; and select the at least one valid recipient based on the organized search.

In one embodiment, alternatively or in addition, the at least one memory stores program instructions that, when executed by the at least one processing unit, cause the apparatus to maintain the number of selected valid recipients to which the emergency communication has been sent within a predetermined minimum or maximum number of selected valid recipients.

In one embodiment, alternatively or in addition, the at least one memory stores program instructions that, when executed by the at least one processing unit, cause the apparatus to select a predetermined number of new valid recipients when a timer expires, after a certain time limit and/or when the number of arrived and/or acknowledged recipients has not reached a predetermined maximum limit or a predetermined minimum limit.

In one embodiment, alternatively or in addition, the at least one memory stores program instructions that, when executed by the at least one processing unit, cause the apparatus to determine that no acknowledgement has been received within a recipient specific acknowledgement time limit from a selected valid recipient to which the emergency communication was caused to be sent; deselect the previously selected valid recipient from which no acknowledgement has been received within a recipient specific acknowledgement time limit; select a new valid recipient; and cause transmission of the emergency communication to a recipient device corresponding to the selected new valid recipient.

In one embodiment, alternatively or in addition, the at least one memory stores program instructions that, when executed by the at least one processing unit, cause the apparatus to determine that a recipient device of a recipient is within a predetermined spatial and/or temporal minimum distance from the user device; and exclude the recipient from the search for and/or selection of valid recipients.

In one embodiment, alternatively or in addition, the at least one memory stores program instructions that, when executed by the at least one processing unit, cause the apparatus to determine that a group of recipients is within a predetermined spatial and/or temporal minimum distance from the user; and enable selecting only a subgroup of the group of recipients or excluding the group of recipients as a whole when searching and/or selecting the at least one selected valid recipient.

In one embodiment, alternatively or in addition, the at least one memory stores program instructions that, when executed by the at least one processing unit, cause the apparatus to stop the searching, selecting and/or transmitting when at least one of the following is fulfilled: the number of acknowledged and/or arrived recipients reaches a predetermined maximum limit or a predetermined minimum limit; no new valid recipients are available; no Internet connection is available for the user device; the user of the user device cannot be located; and the user of the user device has provided a confirmation that the user is safe.

In one embodiment, alternatively or in addition, the at least one memory stores program instructions that, when executed by the at least one processing unit, cause the apparatus to determine at least one of the following: no new valid online recipients are available; a general timer started when the emergency communication was transmitted to a first selected valid recipient has expired or a certain time limit has expired; and the number of acknowledged and/or arrived recipients has not reached a predetermined maximum limit or a predetermined minimum limit; selecting at least one offline recipient; and causing transmission of the emergency communication to an offline recipient device corresponding to the at least one selected offline recipient.

In one embodiment, alternatively or in addition, the at least one memory stores program instructions that, when executed by the at least one processing unit, cause the apparatus to organize the offline recipients found in the search according to the most recent online time stamp; and select the at least one offline recipient based on the organized search.

In one embodiment, alternatively or in addition, the at least one memory stores program instructions that, when executed by the at least one processing unit, cause the apparatus to organize the offline recipients found in the search according to the shortest spatial and/or temporal distance between the user device and the latest location of an offline recipient device of an offline recipient; and select the at least one offline recipient based on the organized search.

In one embodiment, alternatively or in addition, the at least one memory stores program instructions that, when executed by the at least one processing unit, cause the apparatus to organize the offline recipients found in the search according to the most recent online time stamp and the shortest spatial and/or temporal distance between the user device and the latest location of an offline recipient device of an offline recipient; and select the at least one offline recipient based on the organized search.

In one embodiment, alternatively or in addition, the at least one memory stores program instructions that, when executed by the at least one processing unit, cause the apparatus to firstly organize the offline recipients found in the search according to the most recent online time stamp or the shortest spatial and/or temporal distance between the user device and the latest location of an offline recipient device of an offline recipient; secondly organize the offline recipients according to the shortest spatial and/or temporal distance between the user device and the latest location of an offline recipient device of an offline recipient or the most recent online time stamp; and select the at least one offline recipient based on the organized search.

In one embodiment, alternatively or in addition, the at least one memory stores program instructions that, when executed by the at least one processing unit, cause the apparatus to determine at least one of the following: no new valid online recipients are available; a general timer started when the emergency communication was transmitted to a first selected valid recipient has expired or certain time limit has expired; and the number of acknowledged and/or arrived recipients has not reached a predetermined maximum limit or a predetermined minimum limit; determining, by the at least one processing unit, offline recipients that are most probably within a predetermined spatial and/or temporal minimum or maximum distance from the user device based on statistical or any other amount of online activity from a specific location or address; selecting at least one most probable offline recipient; and causing transmission of the emergency communication to an offline recipient device corresponding to the at least one selected most probable offline recipient.

In one embodiment, alternatively or in addition, the at least one memory stores program instructions that, when executed by the at least one processing unit, cause the apparatus to initiate a canceling timer; provide the canceling timer via a user interface to the user; and cancel the emergency communication if receiving a cancel confirmation from the user before the canceling timer expires.

In one embodiment, alternatively or in addition, the at least one memory stores program instructions that, when executed by the at least one processing unit, cause the apparatus to delay the transmission of the emergency communication to the recipient device corresponding to the at least one selected valid recipient by a delay time amount after receiving the signal indicating the emergency relating to the user of the user device; and cause transmission of the emergency communication to the recipient device corresponding to the at least one selected valid recipient if receiving no cancel confirmation from the user during the delay time amount.

In one embodiment, alternatively or in addition, the at least one memory stores program instructions that, when executed by the at least one processing unit, cause the apparatus to enable the user to provide a safety confirmation via a user interface of the user device; and terminate the emergency communication when receiving the safety confirmation.

In one embodiment, alternatively or in addition, the at least one memory stores program instructions that, when executed by the at least one processing unit, cause the apparatus to determine that the user has reached a safety point or a predetermined destination or that a valid recipient has reached the user's location; enable the user to provide a safety confirmation through the user device, preferably via a user interface; and terminate the emergency communication when receiving the safety confirmation.

In one embodiment, alternatively or in addition, the at least one memory stores program instructions that, when executed by the at least one processing unit, cause the apparatus to determine that the user has reached a safety point or a predetermined destination or that a valid recipient has reached the user's location; and terminate the emergency communication.

In one embodiment, alternatively or in addition, the at least one memory stores program instructions that, when executed by the at least one processing unit, cause the apparatus to cause transmission of the emergency communication to at least one primary contact in addition to causing transmission of the emergency communication to the at least one valid recipient.

In one embodiment, alternatively or in addition, the at least one memory stores program instructions that, when executed by the at least one processing unit, cause the apparatus to indicate in the emergency communication to the recipient device corresponding to the at least one selected valid recipient that the recipient device is to delay the display of the emergency communication to the recipient by a delay time amount.

In one embodiment, alternatively or in addition, the at least one memory stores program instructions that, when executed by the at least one processing unit, cause the apparatus to detect a deviation from an expected behavior of the user; and initiate the signal indicating the emergency relating to the user of the user device.

In one embodiment, alternatively or in addition, the at least one memory stores program instructions that, when executed by the at least one processing unit, cause the apparatus to request a safety confirmation from the user after detecting the deviation from the expected behavior of the user; and automatically initiate the signal indicating the emergency relating to the user of the user device when receiving no confirmation from the user within a predetermined time limit.

In one embodiment, alternatively or in addition, the deviation from the expected behavior comprises at least one of the following: deviation from an expected and/or predetermined route; acceleration or deceleration; a missed estimated time of arrival; an increase in the estimated time of arrival; distance to/from a predetermined location; detected strange, deviant or unexpected movement by the user; detected strange, deviant, unexpected movement by the user device or directed to the user device; immobility; and a variation in body function, such as an increase or a decrease in a pulse rate.

In one embodiment, alternatively or in addition, the at least one memory stores program instructions that, when executed by the at least one processing unit, cause the apparatus to detect an event concerning recent, latest or present location of the user of the user device; and requesting, by the at least one processing unit, a safety confirmation from the user after detecting the event.

In one embodiment, alternatively or in addition, the at least one memory stores program instructions that, when executed by the at least one processing unit, cause the apparatus to request a safety confirmation from the user of the user device when the user reaches a predetermined location or departs from a predetermined location.

In one embodiment, alternatively or in addition, the at least one memory stores program instructions that, when executed by the at least one processing unit, cause the apparatus to automatically initiate the signal indicating the emergency relating to the user of the user device when receiving no confirmation from the user within a predetermined time limit.

In one embodiment, alternatively or in addition, the at least one memory stores program instructions that, when executed by the at least one processing unit, cause the apparatus to cause transmission of a safety confirmation when the user reaches a predetermined location or departs from a predetermined location.

According to a fourth aspect, there is provided an apparatus for controlling an emergency communication. The apparatus comprises means for detecting a signal indicating an emergency relating to a user of a user device; means for searching for valid recipients for an emergency communication relating to the emergency, a valid recipient being determined based at least on preferably online status of the recipient and/or spatial and/or temporal distance between the user device and a recipient device of the valid recipient; means for selecting at least one valid recipient found in the search; and means for causing transmission of the emergency communication to a recipient device corresponding to the at least one selected valid recipient.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1A:
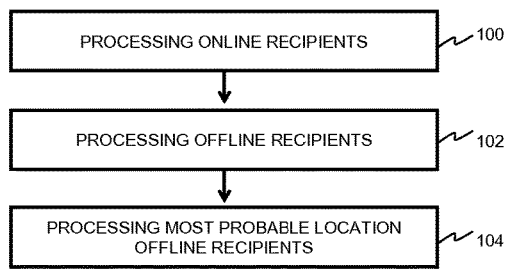
FIG. 1A illustrates a general flow diagram illustrating a method for controlling an emergency communication.

FIG. 1A illustrates a general flow diagram illustrating a method for controlling an emergency communication according to one embodiment. The method is generally divided into three parts. In the first part, only online recipients are processed 100. In the second part, offline recipients are processed 102. The second part may take into account only most recent and/or nearest offline recipients. In the third part, most probable location offline users are processed 104.

At least part of the required processing may be executed by a processing unit, which may be comprised in a user or terminal device or apparatus or be located at a server optionally in a cloud computing environment. In some embodiments, processing is distributed among a plurality of devices such as between at least one terminal device and at least one server.

Figure 1B:
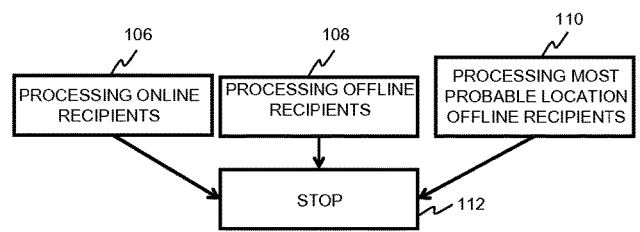
FIG. 1B illustrates a flow diagram illustrating a method for controlling an emergency communication.

FIG. 1B illustrates a general flow diagram illustrating a method for controlling an emergency communication according to another embodiment. In FIG. 1A, the processing proceeded sequentially starting from processing online recipient. FIG. 1B illustrates an embodiment where processing of online recipients 106, offline recipients 108 and most probable location offline recipients 110 may be performed in parallel. Yet in another embodiment, certain parts of the processes may be performed in parallel and other parts sequentially. This will be further discussed in the following illustrations.

Figure 1C:
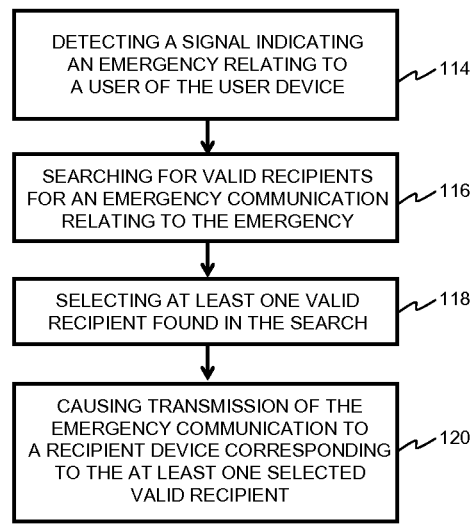
FIG. 1C illustrates a flow diagram illustrating a method for controlling an emergency communication.

FIG. 1C illustrates a flow diagram illustrating a method for controlling an emergency communication. The method may be performed by a communication server that is configured to detect a signal indicating an emergency relating to a user of a user device 114. The detecting may comprise that a signal indicating an emergency relating to a user of a user device is received. The signal may be an alarm, and a user may initiate the alarm, for example, via a user interface of the user device, using voice control, using gestures etc. In another embodiment, the alarm is initiated automatically without user actions, for example when detecting deviation from expected behavior or a variation in body function. In one embodiment, the method may be performed by a user device, which directly communicates with other user devices and/or safety applications in those devices. The communication server is accessible via a network. The network may be, for example, a local-area network (LAN), such as a company intranet, a metropolitan area network (MAN), or a wide area network (WAN), such as the Internet and the World Wide Web. The network may be any type and/or form of network and may include, for example, any of a point-to-point network, a broadcast network, a wide area network, a local area network, a telecommunications network, a data communication network, a computer network, an asynchronous transfer mode (ATM) network, a synchronous optical network (SONET), a wireless network, an optical fiber network, and a wired network.

The emergency may relate to any situation that causes the user to request assistance, for example, an accident, a threat etc. In response to receiving the signal, a search for valid recipients for an emergency communication relating to the emergency is started 116. A valid recipient may be determined based at least on online status of the recipient and spatial and/or temporal distance between the user or the user device and the valid recipient or the device of the valid recipient. The term "online status" of the recipient may refer to a status of the recipient who is using or has recently used a similar or the same safety application than the user. The spatial distance may, for example, refer to geographical distance, and the user and/or the application may set any value or range to the specific geographical distance within which recipients are searched for. For example, the user and/or the application may set that other users within 5km radius are searched for. Temporal distance may refer to determining the distance between the user and the recipient based on time. For example, a recipient being geographically farther may be temporally nearer than a recipient who is geographically nearer.

At least one valid recipient found in the search is selected 118. For example, the selection may be performed so that one or more valid recipients nearest to the user are selected. The emergency communication may then be transmitted to the selected at least one valid recipient 120. The transmission may be performed using peer-to-peer communication between the applications used by the user and the selected valid recipient or using any appropriate means for communication, for example, a network, the Internet, short message service, any other form of telecommunication etc. The emergency communication may comprise informing a recipient of the occurrence of an emergency.

By taking into account the online status of the recipients and/or the spatial and/or temporal distance between the user device and a recipient device of the valid recipient, this enables efficiently and quickly finding the recipients that are able to help the user of the user device, making the emergency communication more efficient for example compared to only taking into account the geographical distance between the users.

Figure 1D:
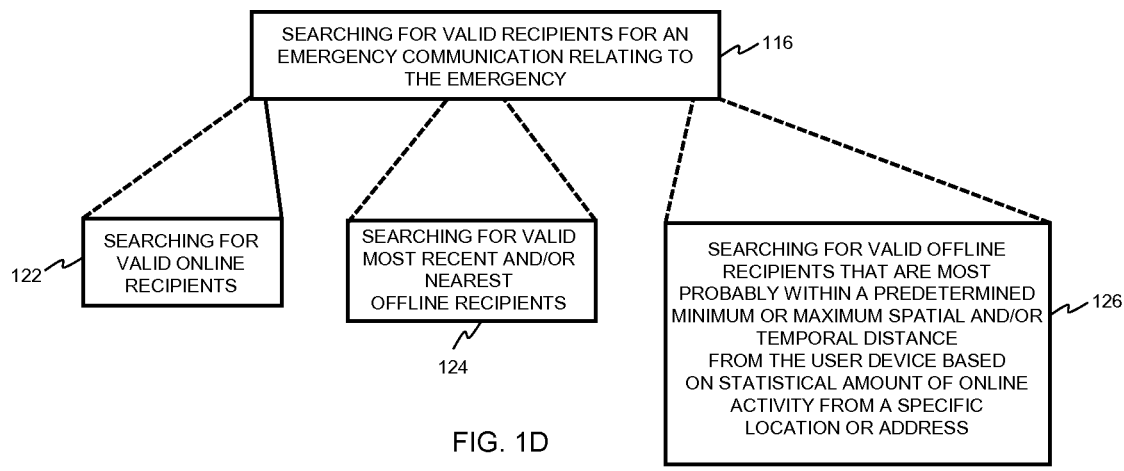
FIG. 1D illustrates the search for valid recipients in more detail according to one embodiment.

FIG. 1D illustrates the search for valid recipients in more detail according to one embodiment. The search for valid recipients 116 may involve two kinds of recipients, online recipients and offline recipients.

A block 122 illustrates that the search may be directed only to online recipients. The term online recipient may refer to a recipient who is using or has recently used a similar or the same safety application than the user having the emergency.

In one embodiment, the search process queries from a database for all users and their locations and returns as a result all users who are online, or online users who are within a predetermined spatial and/or temporal distance from the user who initiated the emergency communication.

A valid online recipient may be determined based at least on online status of the recipient and the spatial and/or temporal distance between the user and the valid recipient. The term "online status" of the recipient may refer to a status of the recipient who is using or has recently used a similar or the same safety application than the user. An online recipient may thus refer to a user or user device that is using or has used the same or a similar safety application or has such an application installed in the device, where the application is currently running, and/or the device has network access such as internet access, and/or a communication may be sent to the user or device. The user and/or the application may set any value to the specific geographical distance. For example, the user and/or the application may set that other online users within 5km radius are searched for.

Further, it may be determined that one or more recipients are in exactly the same location than the user, close to the user or within a specified distance from the user. In that case it is possible to exclude such a valid recipient or recipients from the valid recipient selection process. In another embodiment, it may be determined that a group of valid recipients are in the same location than the user, close to the user or within a specified distance from the user. In response to this, a subgroup of these valid recipients may be selected. The subgroup may be selected according to certain criteria, such as for instance a predetermined number of valid recipients that are closest to the user or valid recipients that are within a second specified spatial and/or temporal distance from the user. Yet in another embodiment, none of these valid recipients are selected.

By taking into account that a valid recipient who is in the same location or too close to the user who initiated the emergency communication, this enables preventing misuse of the application and transmitting the emergency communication to recipients who are not the potential cause for the emergency communication.

The search for valid online recipients may comprise organizing the valid recipients found in the search according to the shortest spatial and/or temporal distance between the user device and the recipient device of the valid recipient. Alternatively, the search for valid online recipient may comprise organizing the valid recipients found in the search according to most recent online timestamp. Alternatively, search for valid online recipient may comprise organizing the at least one valid recipient found in the search based on the shortest spatial and/or temporal distance between the user device and the recipient device of the valid recipient and/or the most recent online timestamp or vice versa.

As a summary, the search for valid online recipients provides a specific amount of valid online recipients, for example, 20 or any other specified amount to which the emergency communication may then be sent.

A block 124 provides another possibility for the search for valid recipients. The term "offline recipient" may refer to a user who uses a safety application but currently the safety application is terminated in a user device of the user. An offline recipient may also for example refer to a user who uses the same or a similar safety application but cannot be verified as being "online" regardless of the state of the safety application. For example, an offline recipient, i.e. a user with an "offline status", may refer to a user of a device or a device itself in which a safety application is installed, but the device cannot be located due to for example the device being turned off or no network connection. An offline recipient may also be a user to which a communication cannot be sent to.

In one embodiment, the search queries from a database for all users and their locations and returns as a result all users who are offline; or offline users with the most recent online timestamp; or offline users with most recent location within a predetermined spatial and/or temporal distance from the user who initiated the emergency communication.

The search process may organize or sort the results based on one of the following schemes:

1) according to the most recent online timestamp (i.e. the latest timestamp when the offline user was online)
2) according to the offline users' most recent location having the shortest spatial and/or temporal distance (for example, coordinate difference) to the user who initiated the emergency communication (for example, the smallest geographical distance between the user who initiated the emergency communication and the offline user's latest known location).

3) according to both most recent online timestamp and most recent location with shortest spatial and/or temporal distance to the user who initiated the emergency communication (for example, by ranking the results by using a ranking algorithm or key value pairs and taking an average or median of the organized results).

4) first according to the most recent timestamp and then according to the most recent location with the shortest spatial and/or temporal distance to the user who initiated the emergency communication or vice versa.

As a summary, the search for valid offline recipients provides a specific amount of valid offline recipients, for example, 20 or any other specified amount to which the emergency communication may then be sent.

A block 126 provides another possibility for the search for valid recipients. Statistical or any other mathematical analysis may be used to determine offline recipients to which to send an emergency communication relating to the user. The search process determines offline recipients that are most probably within a predetermined minimum or maximum spatial and/or temporal distance from the user device based on statistical or any other amount of online activity from a specific location or address.

In one embodiment, the search process queries from a database for all users and their locations and returns as a result all users who are offline; or offline users with the most recent online timestamp; or offline users with most recent location within a predetermined spatial and/or temporal distance from the user who initiated the emergency communication.

The search process may use reverse geo-coding and read the data received from the reversed geo-coding, for example, in order to determine the online and/or offline users' country, country code, city, address and postal code from the users' location data, for example, location coordinates. The search process may utilize or read data from a specific database table that includes data of locations (for example, a postal code area or street address) where a specific recipient has been online. The database may have a counter or any other ranking method to track how many times a specific user has been online, for example, from a certain location or address.

The search process may organize or sort the results according to one or more of the following parameters or by using any other sorting method utilizing any other ranking method:

1) the user's country
2) the user's country code
3) the user's city
4) the user's address
5) the user's postal code
6) the user's coordinates or any other parameter or location data that may be used to define a location.

In one embodiment, the search process then compares this location data to the location data of the user who initiated the emergency communication in order to determine that the offline users' probable location is the same (for example, country, postal code etc.) than the location of the user who initiated the emergency communication.

The search process may then filter or limit the results according to any combination of some or all of the parameters above. Then, the search process may organize the resulting subset according to a counter or with any other ranking algorithm or method that keeps track how many times a certain user has been to a certain location (for example, a postal code area or street address) or determines the basic value of the location with a ranking algorithm or method.

Then the search process may organize or limit the results according to the shortest spatial and/or temporal distance to the user who initiated the emergency communication, for example, according to the smallest geographical distance based on coordinate difference between the user who initiated the emergency communication and the probable location of the offline user.

After the search for valid recipients has been performed for the first time, there are several possibilities how to proceed with the searching process. In one embodiment, the search results are continuously updated. This means that the search process continuously tries to find best candidates for valid recipients. In another embodiment, the search results are updated after a search timer expires or after a certain time limit. In other words, the search process is repeated periodically. Yet in another embodiment, the search results are updated only when a new valid recipient needs to be selected. Yet in another embodiment, only a single search is performed in response to detecting the signal indicating the emergency, the search results of the single search comprises a predetermined number of valid recipients. The predetermined number may be set to any amount, for example, to 100 valid recipients.

The searching process 116 for valid recipients may comprise any combination of the illustrated sub-processes 122, 124 and 126.

By taking into account both online and offline users when searching and selecting valid recipients, this enables efficiently and quickly finding more valid recipients that are able to help the user of the user device and making the emergency communication more efficient compared to only transmitting the emergency communication to online users.

Figure 2:
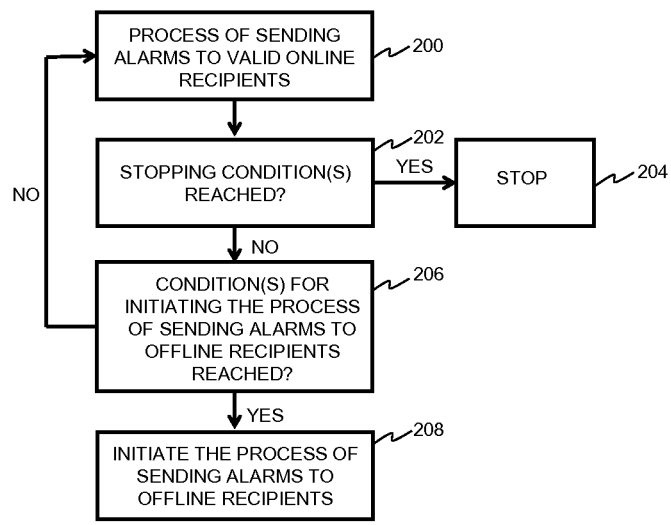
FIG. 2 illustrates a flow diagram illustrating a method for sending alarms to valid recipients.

FIG. 2 illustrates a flow diagram illustrating a process for sending alarms to valid online recipients 200. The method may be performed by a communication server that is configured to detect a signal indicating an emergency relating to a user of a user device. The emergency may relate to any situation that causes the user to request assistance, for example, an accident, a threat etc. In response to detecting the signal, a search for valid recipients for an emergency communication relating to the emergency is started. The search process has been illustrated in more detail already above in FIG. 1D and its description. In one embodiment, the detecting comprises receiving a signal indicating the emergency.

The alarm is sent to the selected valid online recipients. For example, the alarm may be sent to a predetermined amount of recipients, for example, to 20 selected valid recipients. Additionally and/or instead, the alarm or other communication may also be sent to primary contacts relating to the user.

The valid recipients to whom the alarm has been sent have a certain time (i.e. a recipient specific time limit) that they stay as valid recipients if they do not acknowledge the alarm within a set time limit, for example, two minutes.

Information regarding the alarm may be saved to a database. For example, the following pieces of information may be saved: alarm sender user identifier, alarm timestamp, alarm sender's location, number of alarm recipients, recipients' user identifiers, recipients' locations, identifiers of acknowledged recipients.

The process tracks the time that has passed from sending the alarm to the selected valid recipients. The process also tracks which valid recipients have or have not received or acknowledged the alarm within the set time limit. If a valid recipient has not acknowledged the alarm with the set time limit, the process chooses a new valid recipient to which the alarm is then sent. Again, the process initiates a recipient specific timer for the new valid recipient.

The searching process, selecting process and/or alarm sending process for online recipients may be repeated until a stopping condition or conditions is/are reached 202. The searching process, selecting process and/or alarm sending process to valid online recipients may be repeated until one or more of the following conditions are reached:
1) the number of arrived and/or acknowledged valid online recipients exceeds a certain threshold amount
2) no Internet connection is available or the alarm sender cannot be located any more, (for example, via triangulating or the global positioning system (GPS))
3) the alarm sender has provided a confirmation that the user is safe.

If one or more of the above conditions are reached, the searching process, the selecting process and/or the process of sending alarms to valid online recipients may be stopped 204. Further, at any point in the process of sending the alarms the user who sent the emergency communication may indicate that the user is now safe, i.e., provide a safety confirmation. If such a confirmation is received, there is no need to continue the process any more.

Further, it is possible that certain conditions of initiating the process of sending alarms to offline recipients are reached 206. These conditions may comprise one or more of the following:
1) a general timer has expired, the general timer tracking time since the alarm was sent to a valid recipient for the first time or a set time limit has expired
2) the number of acknowledged and/or arrived recipients does not exceed a certain minimum or maximum threshold amount
3) no new valid online recipients are available.

If the one or more of the conditions above for initiating the process of sending alarms to offline recipients are reached, the process of sending alarm to offline recipients is initiated 208.

The search process illustrated in more detail in FIG. 1D and its description may be performed when the process of sending an alarm or emergency communication to offline recipients is initiated. Alternatively, the search process for offline recipients may have been performed already earlier.

The process of sending the alarms to valid selected offline recipients may be performed similarly than in step 200. The alarm is sent to selected valid offline recipients. The alarm may be sent to a predetermined amount of recipients, for example, to 20 selected valid offline recipients.

The valid offline recipients to whom the alarm has been sent may have a certain time (i.e. a recipient specific time limit) that they stay as valid recipients if they do not acknowledge the alarm within a set time limit, for example, two minutes.

Information regarding the alarm may be saved to a database. For example, the following pieces of information may be saved: alarm sender user identifier, alarm timestamp, alarm sender's location, number of alarm recipients, recipients' user identifiers, recipients' locations, user identifiers of acknowledged recipients.

The process tracks the time that has passed from sending the alarm to the selected valid offline recipients. The process also tracks which valid offline recipients have or have not received or acknowledged the alarm within the set time limit. If a valid offline recipient has not acknowledged the alarm within the set time limit, the process chooses a new valid offline recipient to which the alarm is then sent. Again, the process initiates a recipient specific timer for the new valid offline recipient.

The searching process, selecting process and/or alarm sending process for valid offline recipients may be repeated until a stopping condition or conditions is/are reached. The searching process, selecting process and/or alarm sending process to valid offline recipients may be repeated until one or more of the following conditions are reached:
1) the number of arrived and/or acknowledged valid online or offline recipients exceeds a certain threshold amount
2) no Internet connection is available or the alarm sender cannot be located any more, (for example, via triangulating or the global positioning system (GPS))
3) no new valid online or offline users are available
4) the alarm sender has provided a confirmation that user is safe.

The processing at step 208 may relate to the most recent and nearest offline recipient searching process, which was discussed in more detail in FIG. 1D at step 124. Alternatively or in addition, the processing at step 208 may relate to the most probable location offline recipient searching process, which was discussed in more detail in FIG. 1D at step 126.

Figure 3:
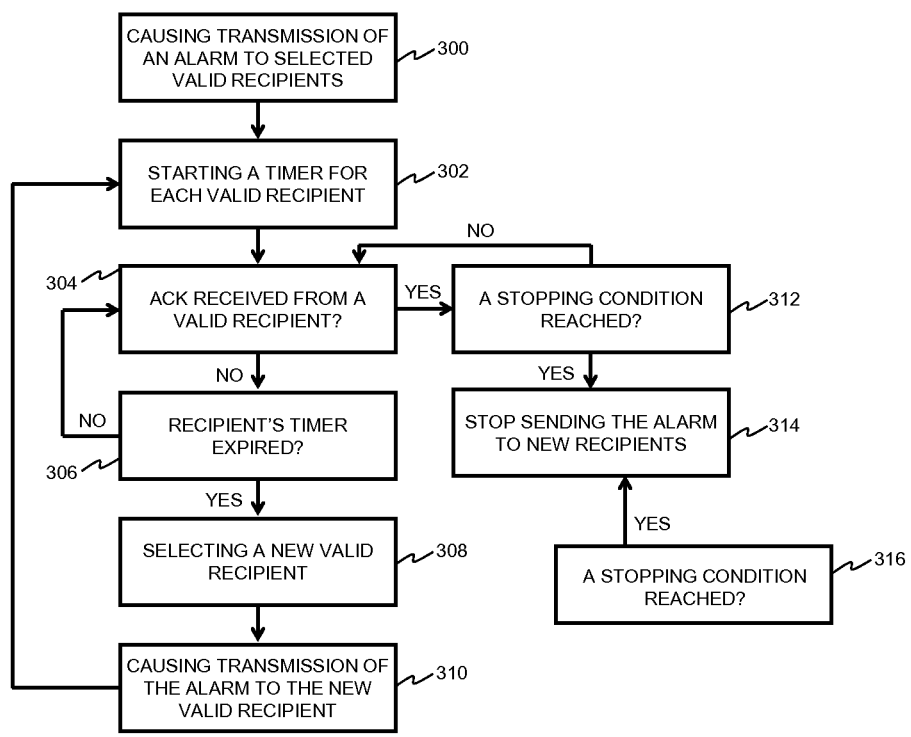
FIG. 3 illustrates a flow diagram illustrating a method for tracking responses from valid recipients to which an emergency communication has been sent.

FIG. 3 illustrates a flow diagram illustrating a method for tracking responses from valid recipients to which an emergency communication has been sent. The emergency communication is caused to be sent to user devices of selected valid online or offline recipients. The emergency may relate to any situation that causes the user to request assistance, for example, an accident, a threat etc. The method may be performed by a communication server that is configured to detect or receive from a user a signal indicating an emergency relating to the user. Alternatively, the method may be performed by a user device executing a safety application and communication may be transmitted between user devices without a server between them.

When the emergency communication is sent 300, a timer is started for each valid recipient 302. The purpose of the timer is to track whether the recipients have responded to the emergency communication within a predetermined time limit. It is then determined whether an acknowledgement has been received from a valid recipient to which the emergency communication was sent earlier 304. If a stopping condition is reached, 312, there is no need to continue sending the emergency communication to new valid recipients 314.

If an acknowledgement has not been received from a valid recipient within the time limit 304 and the recipient's timer has expired 306, a new valid recipient is selected 308. The value of the timer may be set to any desired value, for example, to two minutes. The emergency communication is then caused to be sent to the new valid recipient 310. The processing then returns back to step 302.

If, at any point of the process, it is determined that the stopping condition is reached 316, for example, the number of arrived or acknowledged recipients has reached a threshold value, or the user from which the emergency communication was sent indicates that the user is now safe 316, the searching for new valid recipients is stopped 314.

The above illustrated search, selection and sending process each alone in combination may be performed separately or in parallel for online and offline recipients.

Further, in one embodiment, although it was illustrated above that the searching process, selecting process and/or alarm sending process to valid online or offline recipients may stop when at least one condition was reached (1) the number of arrived and/or acknowledged valid recipients exceeds a certain maximum threshold amount, 2) the number of arrived and/or acknowledged valid recipients exceeds a certain minimum threshold amount (for example, five arrived or acknowledged recipients), 3) no Internet connection is available or the alarm sender cannot be located any more, for example, via triangulating or the global positioning system (GPS), 4) no new valid online or offline users are available, 5) the alarm sender has provided a confirmation that the user is safe), it may still be possible to continue the searching process, selecting process and/or alarm sending process, for example, in a situation where momentarily no valid recipients can be found.

By taking into account and tracking the time for the valid recipients to acknowledge the alarm when searching, selecting and sending alarm to valid recipients, this enables more efficiently and quickly finding new valid recipients that are able to help the user of the user device.

Figure 4:
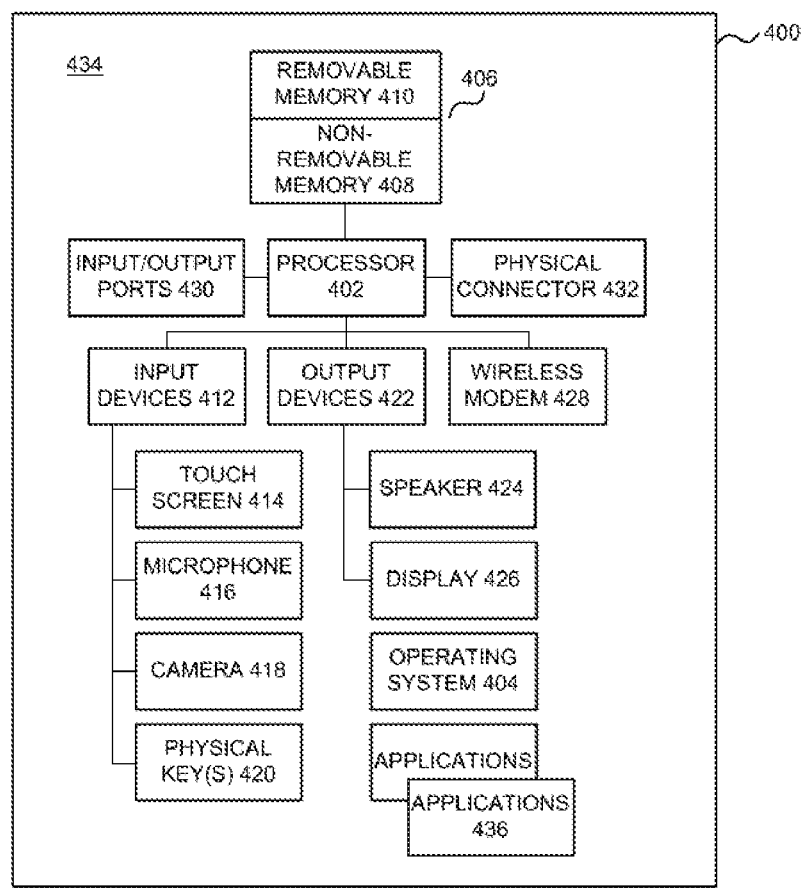
FIG. 4 is a system diagram depicting an apparatus including a variety of optional hardware and software components.

FIG. 4 is a system diagram depicting an apparatus 400 including a variety of optional hardware and software components, shown generally at 434. Any components 434 in the apparatus can communicate with any other component, although not all connections are shown, for ease of illustration. The apparatus can be any of a variety of computing devices (for example, a cell phone, a smart phone, a feature phone, a handheld computer, a tablet computer, a Personal Digital Assistant (PDA), a smart watch, a smart band, smart glasses, a server computer, a communication server etc.) and can allow wired and/or wireless two-way communications with one or more communications networks, such as a cellular, Internet or satellite network.

The illustrated apparatus 400 can include a controller or processor or processing unit 402 (for example, signal processor, microprocessor, ASIC, or other control and processing logic circuitry) for performing such tasks as signal coding, data processing, input/output processing, power control, and/or other functions. An operating system 404 can control the allocation and usage of the components 434 and support for one or more application programs 436. The application programs can include common computing applications (for example, email applications, calendars, contact managers, web browsers, messaging applications, navigation applications), or any other computing application.

The illustrated apparatus 400 can include a memory 406. The memory 406 can include non-removable memory 408 and/or removable memory 410. The non-removable memory 408 can include RAM, ROM, flash memory, a hard disk, or other memory storage technologies. The removable memory 410 can include flash memory or a Subscriber Identity Module (SIM) card, which is in GSM communication systems, or other well-known memory storage technologies, such as "smart cards." The memory 406 can be used for storing data and/or code for running the operating system 404 and the applications 436. Example data can include web pages, text, images, sound files, video data, or other data sets to be sent to and/or received from one or more network servers or other devices via one or more wired or wireless networks. The memory 406 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The apparatus 400 can support one or more input devices 412, such as a touch screen 414, microphone 416, camera 418 and/or physical keys or a keyboard 420 and one or more output devices 422, such as a speaker 424 and a display 426. Other possible output devices (not shown) can include piezoelectric or other haptic output devices. Some devices can serve more than one input/output function. For example, the touch screen 414 and the display 426 can be combined in a single input/output device. The input devices 412 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, body function detection, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 404 or applications 436 can comprise speech-recognition software as part of a voice user interface that allows a user to operate the apparatus 400 via voice commands. Further, the apparatus 400 can comprise input devices and software that allows for user interaction via a user's spatial gestures, such as detecting and interpreting gestures to provide input, for example, to a gaming or a communication application.

A wireless modem 428 can be coupled to an antenna (not shown) and can support two-way communications between the processor 402 and external devices, as is well understood in the art. The modem 428 is shown generically and can include a cellular modem for communicating with a mobile communication network and/or other radio-based modems (for example, Bluetooth or Wi-Fi). The wireless modem 428 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, a 5G network, between cellular networks, or between the apparatus and a public switched telephone network (PSTN) etc.

The apparatus 400 can further include at least one input/output port 430, a satellite navigation system receiver, such as a Global Positioning System (GPS) receiver, an accelerometer, and/or a physical connector 432, which can be, for example, a USB port, IEEE 1394 (FireWire) port, and/or RS-232 port. The illustrated components 434 are not required or all-inclusive, as any components can be deleted and other components can be added.

If the apparatus 400 comprises a communication server accessible via a network, for example, the Internet, and the communication server is configured to execute the processes illustrated in FIGS. 1A, 1B, 1C, 1D, 2 and 3, it is evident that the apparatus 400 may not comprise all elements illustrated in FIG. 4.

The communication server may interact with a database. The database may be an internal memory of the apparatus

400 or external database. The database maintains data related to the communication and to the users of the communication server. For example, for any communication, the database may record one or more of a communication identifier, a spatial and/or temporal position, for example, geographical position for a communication sender or receiver, a communication identifier for the first or closest receiver(s), a time stamp for the current communication, a time stamp for the current rejection or approval of communication, a time stamp for a previous communication, a vector of geographical positions, a vector of communication identifiers, and a vector of communication times. The database may be a relational or non-relational database. The database may also use cloud-based storage or a data warehouse.

The communication server may also interact with one or more user devices, enabling the users to create communication, for example, in written, voice or video format, share their spatial and/or temporal location data on communications, for example, geographical location, and maintain information related to the communication. In some embodiments, users may establish an account with the online website or with communication software or mobile application. The communication server manages such accounts and enables users to maintain account data. In some embodiments, different accounts have different privileges. For example, some accounts may have a premium status. In some embodiments, an account has an associated level, where higher levels allow the account holder or user to access additional features, for example, on the online website or within the software or mobile application. For example, a premium or high-level account may allow the user to create or communicate through short messages or other technologies or networks with restricted user access or access subject to payment and to earn credit for their communication or usage of the software or mobile application.

In an embodiment, the apparatus 400 may through a network connection be able to access a remote processing unit 402, which may perform at least part of the processing conducted in the method for controlling an emergency communication.

Figure 5:
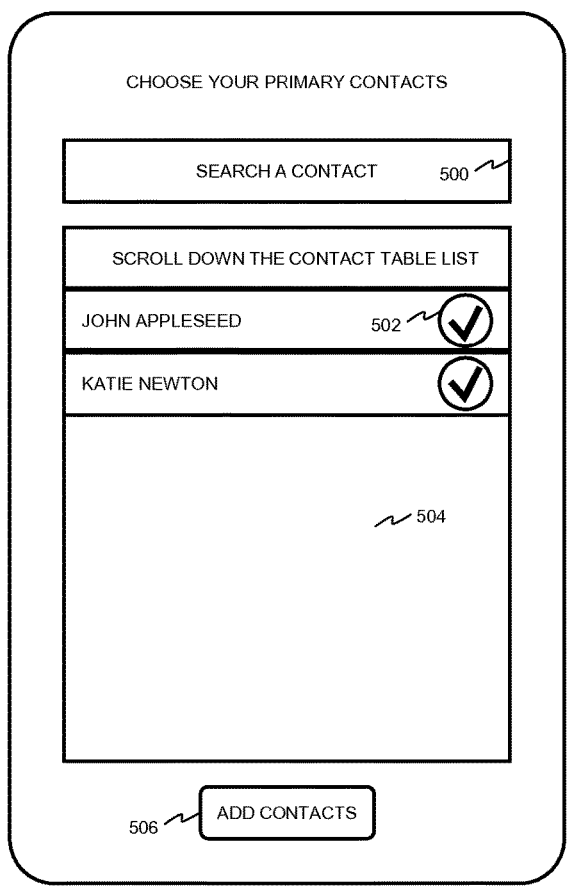
FIG. 5 is an exemplary application view of a safety application that can be executed in a device, for example, a smart phone.

FIG. 5 is an exemplary application view of a safety application that can be executed in a device, for example, a smart phone. Although the mobile device is used as an example device, the device may be any other electronic device that is able to execute or display the application or software.

The safety application may track and save users' location data to servers and/or databases. Such data includes but is not limited to users' coordinates and other relevant location information. The safety application may update users' location continuously both outdoors and indoors when the safety application is in use or in background mode. The safety application may also update users' location information when user enters or leaves a certain area or is within the range of certain location tracking devices. The safety application may also update users' location data in any other situation, for example, within certain time intervals through remote notifications, silent notifications or any other technological solution even when the application is not in use or activated.

The user's location data may be tracked using, for example, GPS technology, GSM technology, radio wave technology, magnetic field technology, telecommunication technology or any other technological solution. The user's location data is tracked using and the safety application may utilize any location tracking, outdoor or indoor positioning technology based on radio waves, magnetic waves, magnetic fields, magnetic field sensors, compass, Bluetooth, Wi-Fi, Li-Fi, Bluetooth Low Energy, iBeacon, indoor/outdoor Wi-Fi location tracking/positioning, indoor/outdoor Bluetooth location tracking, triangulating or any other technical solution for location tracking, outdoor or indoor positioning.

The user may also have been earlier allocated a unique user identifier. The user may also set a passcode or any other similar password or identification method or login credentials, and the passcode may be saved to a database in a hash format or any other encrypted format together with the user identifier and a device identifier.

The application may ask through a push notification access to a user's existing contacts or phone book. The view may be provided in a setup phase of the application. The user may choose desired contacts from the contact list 504 or search a desired contact 500. A selected contact may be indicated by a ticked box 502. When the user has chosen certain amount of contacts, for example, five primary contacts, the application may automatically proceed to a next view. Alternatively, the user may have to separately confirm the selected contacts by tapping "ADD CONTACTS" button 506. The user's primary contacts may be saved to a database. The database may reside in the device itself or it may be an external database provided by a network service.

After user has chosen the contacts and tapped the "ADD CONTACTS" button, the application may show a push notification: "Your chosen contacts will get notified that you added them as your primary contacts". If a primary contact does not use a similar safety application and is not a registered application user, the application may use other communication means (for example, a short message). The application may verify from the database if the user's primary contacts are already registered users, for example, based on an email address or a phone number.

The primary contacts that do not have the application may receive a notification via a short message or other form of message: "A added you as a primary contact in a safety application. You may download the application here (an URL link to an application store)." The primary contacts that already have the application may receive the following notification: "A added you as a primary contact in the safety application."

User may integrate their existing contacts from for example user's phone book or integrated social media accounts to the application and see their location in real time on the application's map interface and/or receive notifications if they are nearby.

Figure 6A:
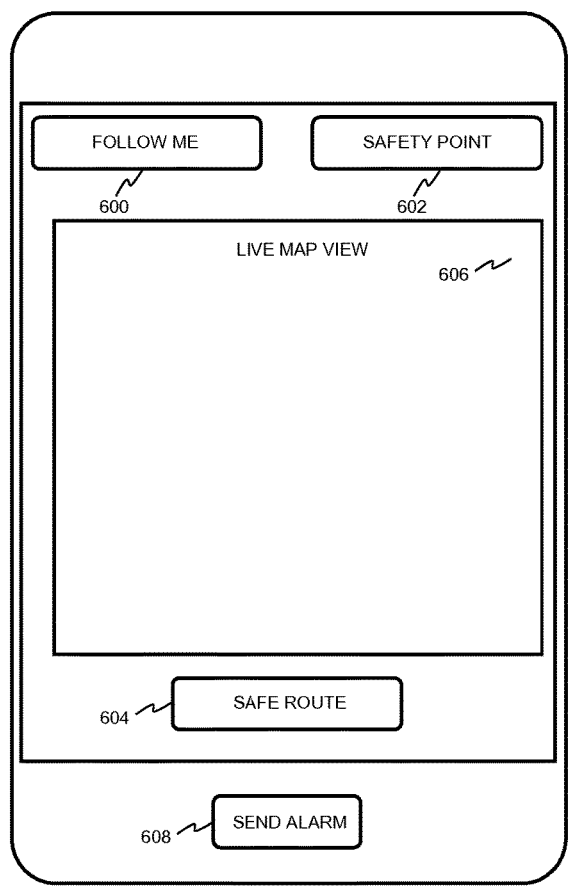
FIGS. 6A-6Z are other exemplary application views of a safety application that can be executed in a device, for example, a smart phone.

FIG. 6A is another exemplary application view of a safety application that can be executed in a device, for example, a smart phone.

The application view may indicate all other online users and safety points on a live map view 606. The term "online" user refers to another user using the same safety application. Other users may be visible as customized map annotations, in any shape or color. Users' map annotations may react to and indicate various user activities with voice or visual effects. For example, map annotation of a recipient who has acknowledged the alarm may change color, shape and/or indicate acknowledgement through a sound effect and/or an animation visible to other users. For example, the alarm sender's map annotation may change color, shape and/or indicate user action through a sound effect and/or an animation visible to other users. Safety points, for example, police stations, hospitals, coffee shops, restaurants, public buildings etc. may be visible as customized map annotations, in any shape or color. The user may not see other users' complete user information on the map or can only see restricted set of user information. For example, only an approximate location of other users may be visible, and/or locations of other users may be visible only for certain time periods and/or in intervals in order to prevent misuse.

An alarm can be sent by selecting "SEND ALARM" button 608. The "SEND ALARM" button may be a button or a slider or any other layout element that requires user interaction. When user selects the alarm button 608 or slides the slider, for example, for a certain amount of time or with certain force applied on a display of the device, the alarm is sent to other users as illustrated in the description of FIGS. 1-3. In another embodiment, the alarm may be initiated also verbally as the application may comprise voice control capabilities. The application may also send the alarm to a private security company's nearest patrol or to one or more moving and/or flying emergency devices or objects that arrive to the user's location when the alarm is initiated. In addition to this, the alarm may be sent to the user's primary contacts and/or to the nearest emergency authorities/emergency dispatcher.

In one embodiment, in order to prevent misuse and false alarms, the number of sent alarms via the safety application in a specific time range, for example, 24 hours may be limited. It may be set that the user is able to send five alarms at maximum per one day. Further, if it is determined that the user has sent a specific number of alarms within a short period of time, for example, within one hour, the user's user account may be banned for a period of time and/or closed permanently.

By tapping the "FOLLOW ME" button 600, the user may request one or more primary contacts, other existing contacts or nearby users to follow the user for a certain time period or from the user's current position to a predetermined destination.

If the user taps the "SAFETY POINT" button 602, the application shows the route, navigation and time estimate to the nearest safety point, for example, a police station, a hospital, a coffee shop etc. The user may also add through settings important places to the map or pin point them on the map, for example, home, work, school, in order to use them as safety points or destinations.

In an embodiment, the safety application may display predetermined destinations and/or objects on a map interface based on certain criteria.

If the user taps the "SAFE ROUTE" button 604, the application proposes the safest route and navigation to a certain destination, route based on, for example, user reviews and official statistics, for example, regarding high-risk or high-criminality areas. The safety application may collect reviews and feedback from the users regarding the safety of the suggested routes. This information may be used, for example, when the user selects the "SAFE ROUTE" button 604. The users may provide feedback regarding the routes proposed by the safety application using, for example the scale from 1 to 5.

When an alarm is sent, the safety application may also automatically activate audio and/or video recording with the device. The safety application may also provide an auditory, vibration or any other indication to indicate for the user that the alarm has been sent.

Figure 6B:
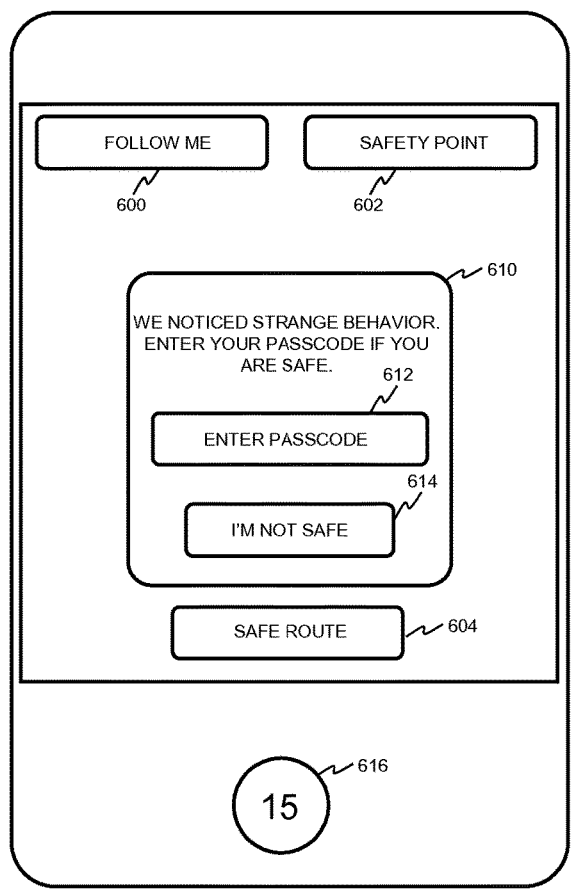

FIG. 6B is another exemplary application view of a safety application that can be executed in a device, for example, a smart phone.

For example, if the user starts to run, accelerates, stops for a certain time period, for example during navigation, deviates from a given route, does not arrive within estimated time to a given destination, estimated time or distance rises, the user's headphones are unplugged or any other form of strange or unexpected behavior according to selected, monitored criterion is noticed or the phone is dropped, shaken, thrown or otherwise moved in a strange manner, the application may send a push notification 610 to the user. Further, if a variation occurs in one or more of the user's body functions, such as if a pulse rate suddenly rises or descends in an abnormal manner or over/below a certain threshold, the application may provide a push notification for the user to ask whether the user is safe or not. The device may comprise one or more detectors or sensors (for example, an accelerometer, a pulse rate sensor etc.) providing data based on which it is possible to determine an unexpected behavior or situation. For example, a notification to the user and/or an automatic alarm may be initiated in some embodiments if a microphone comprised in the user device detects that a certain predetermined decibel threshold is exceeded, such as if the user screams. Further, in one embodiment, if encountering a certain unexpected user pattern, for example, the user's pulse rate lowers or rises or the user remains motionless for a certain period of time, the application may provide a push notification for the user to ask whether the user is safe or not and/or an alarm may be initiated automatically.

In one embodiment, artificial intelligence or other self-learning algorithms, software, or technology may be utilized to determine unexpected behavior of a user. As an example, software may be able to determine if a user has deviated from an expected route of travel, such a usual route for a certain recurring trip, or has moved to an unexpected location.

If user does not enter a correct passcode 612 or use a fingerprint verification feature of the device, for example, Touch ID within a certain time limit, for example, 15 seconds, an alarm is sent out. The time left may be shown in the interface element 616. If user taps "I'M NOT SAFE" button 614, an alarm will be automatically issued.

Regarding the user's strange behavior or deviation from a given route, the application calculates a possible deviation from a given route. If the user misses the estimated time of arrival with a certain threshold amount of time, or the estimated time of arrival to a certain destination calculated by the application rises with a certain threshold amount or the estimated distance to/from a certain destination provided/calculated by the application rises with a certain threshold amount, the application may ask the user to verify that the user is safe and/or an alarm may be issued automatically. All deviations initiate the strange behavior feature and the application may ask the user to verify that user is safe within a certain time limit. Further, in general the safety application may detect any deviation from an expected behavior of the user, and initiate the alarm relating to the user either automatically or after first requesting a safety confirmation from the user and not receiving the confirmation, or receiving an indication from the user that the user is not safe. The deviation may for example refer to a deviation from an expected and/or predetermined route, acceleration or deceleration; a missed estimated time of arrival, an increase in the estimated time of arrival, distance to/from a predetermined location, detected strange, deviant or unexpected movement by the user, detected strange, deviant, unexpected movement by the user device or directed to the user device, immobility, and a variation in body function, such as an increase or a decrease in a pulse rate etc.

Figure 6C:
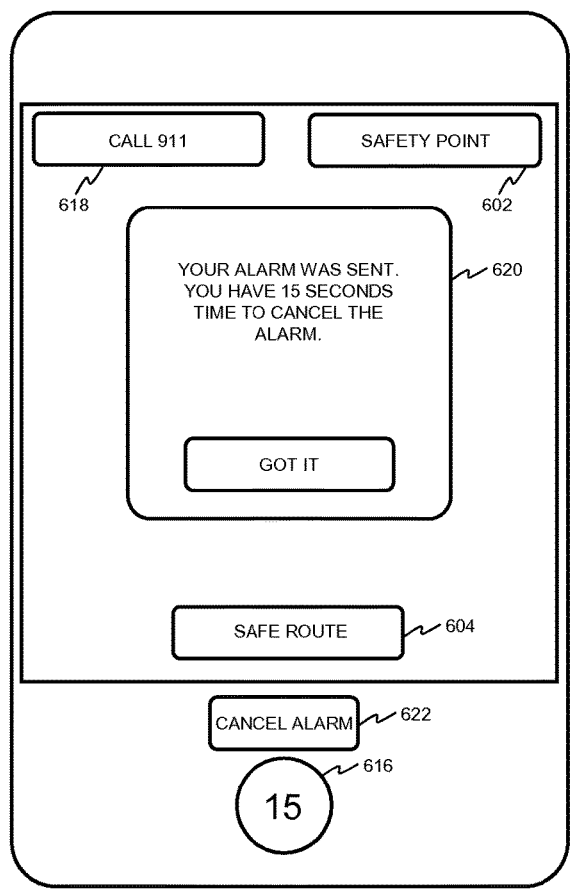

FIG. 6C is another exemplary application view of a safety application that can be executed in a device, for example, a smart phone.

By selecting the "CANCEL ALARM" button 622, the user is able to cancel the alarm. The "CANCEL ALARM" button may be a button or a slider or any other layout element that requires user interaction. The time remaining for canceling the alarm may be shown 616 below, above or on the "CANCEL ALARM" 622 button. When the alarm has been sent out, a push notification may appear on the application view: "Your alarm was sent. You have 15 seconds time to cancel the alarm." The cancel alarm time may be any amount of time above 0 seconds. The user may be required to select "GOT IT" button in order to see the map view again. After the time has run out, the user may be given a push notification "You can no longer cancel the alarm". The alarm may also be cancelled verbally, using voice control but a passcode or a fingerprint or other form of verification, for example, voice/face recognition may still be required.

Other users that have received the user's alarm and/or responded that they are on their way to the user may be shown as map annotations in the live map view.

A "CALL 911" button 618 may also be provided by the application, and tapping this button automatically starts calling, for example the nearest emergency authorities/dispatcher. Tapping the "CALL 911" button 618 also shares the user's location information and possibly also other information, for example, medical information automatically with the emergency authorities/dispatcher.

Figure 6D:
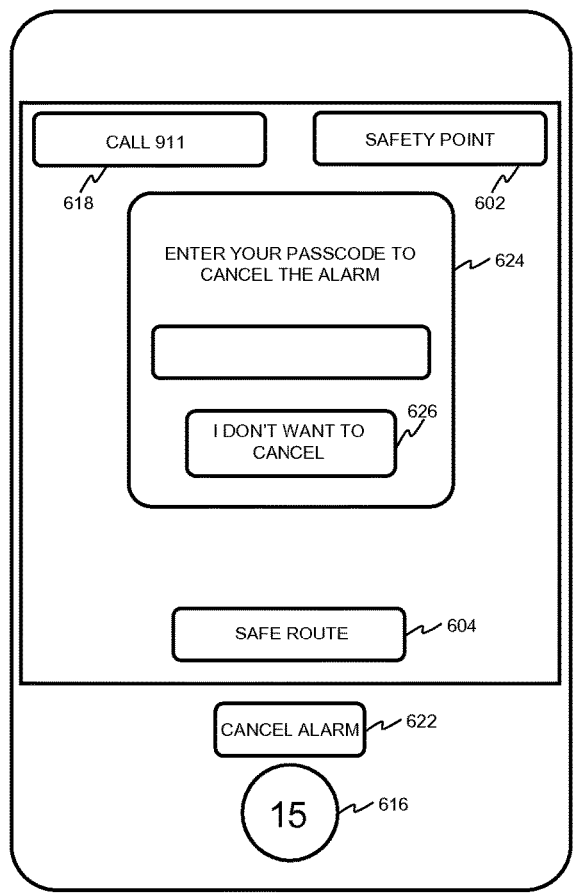
Figure 6E:
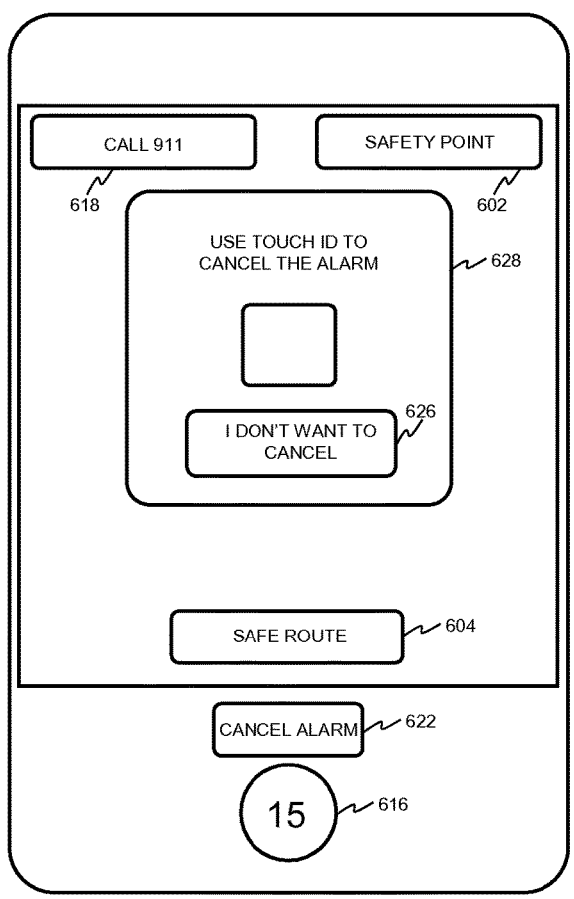

FIGS. 6D and 6E are other exemplary application views of a safety application that can be executed in a device, for example, a smart phone.

If the user decides to cancel the alarm by tapping the "CANCEL ALARM" button 622, the application may show a push notification "Enter your passcode to cancel the alarm" 624 OR "Use fingerprint verification/Touch ID to cancel the alarm" 628 and requires user's passcode or fingerprint verification in order to cancel the alarm. If the user does not want to cancel the alarm, the user may specifically tap the "I DON'T WANT TO CANCEL" button 626 to get back to the live map view.

Information regarding the alarm, for example, the alarm sender's user identifier, timestamp for the alarm, sender's location data (for example, the coordinates), if the alarm is cancelled, a timestamp for the cancellation, alarm recipients' user identifiers, the recipients' location data (for example, the coordinates), the recipients' user identifiers who have responded to the alarm (acknowledged), a timestamp for responds/acknowledgements, location data of the responded users (for example, the coordinates), a timestamp for "I'M SAFE" confirmation and a location for "I'M SAFE" confirmation may be saved to a database in the device and/or in a network.

In one embodiment, alarm information is sent to selected users and/or primary contacts, but the alarm will not be visible for them until the cancel time is over. In other words, when an alarm is sent and the alarm cancel time starts running, the application may send the alarm, for example, as a silent notification or any other form notification/message to a communication server and/or recipient device's memory, for example, random access memory, local database, core data or other memory. In order to avoid misuse and false alarms, the communication server and/or alarm recipient's application preserves the alarm in the recipient device's memory until the cancel time has run out. After the cancel time has run out, the alarm is released from the server and/or the memory and the alarm recipient's application or device displays the alarm to the recipient. If sender has cancelled the alarm during cancel time, the alarm is cancelled from the communication server and/or the recipient device's memory and is never displayed to the recipient.

Figure 6F:
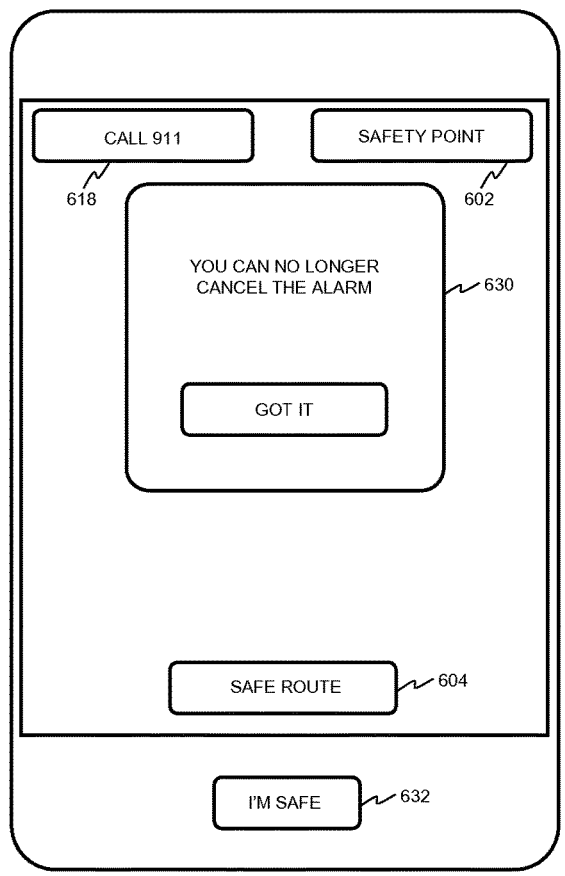

FIG. 6F is another exemplary application view of a safety application that can be executed in a device, for example, a smart phone.

After the cancel time has run out, the user may be provided with a push notification "YOU CAN NO LONGER CANCEL THE ALARM" 630. If the user wishes to proceed further, the user may have to select "GOT IT" button in order to return to the live map view.

The user may also tap the "SAFETY POINT" button 602 which will show the route, navigation and time estimate to the nearest safety point on the map.

Further, the application view may enable the "I'M SAFE" 632 button, i.e., request or facilitate providing a safety confirmation, for example, when user reaches a safety point, a predetermined destination and/or a first alarm recipient and/or primary contact reaches to the user's location. The "I'M SAFE" button may be a button or a slider or any other layout element that requires user interaction.

The application may also facilitate automatic safety confirmation when the user has arrived in a predetermined destination and/or a safety point or when the user leaves a certain location. The application may additionally or alternatively facilitate automatic safety confirmation when a follower and/or contact and/or recipient has arrived to the user's location.

Figure 6G:
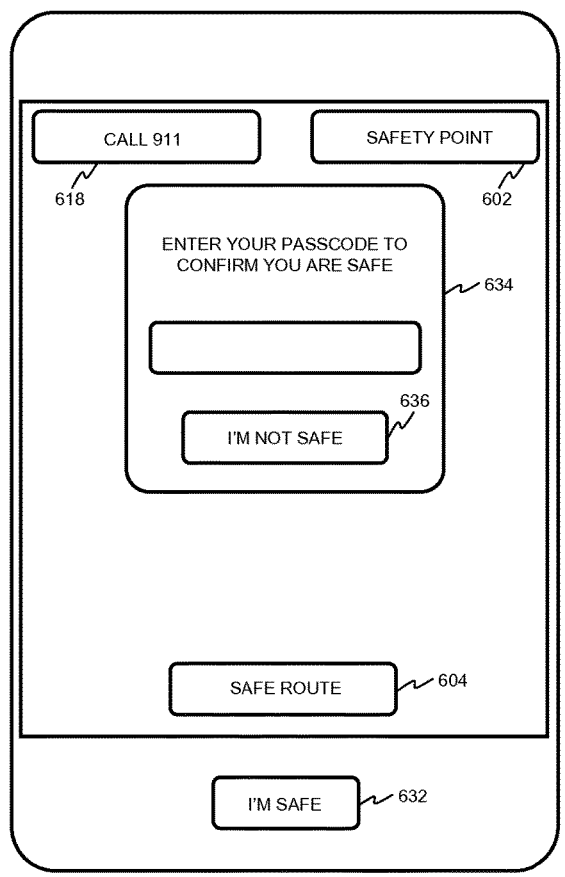
Figure 6H:
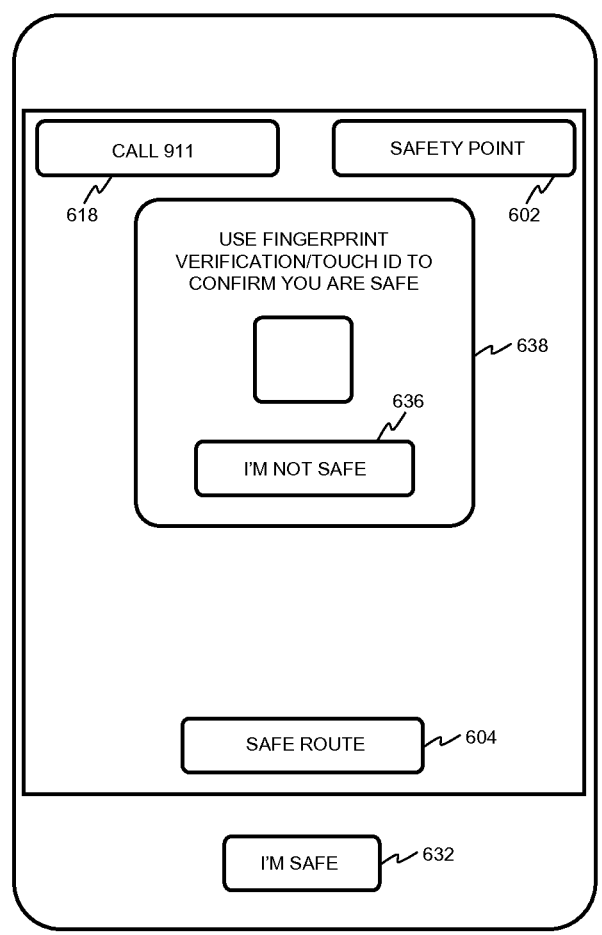

FIGS. 6G and 6H are other exemplary application views of a safety application that can be executed in a device, for example, a smart phone.

When the user taps the "I'M SAFE" button 632 or slides "I'M SAFE" slider, the application provides a push notification "ENTER YOUR PASSCODE" 634 or "USE FINGERPRINT VERIFICATION/TOUCH ID TO CONFIRM THAT YOU ARE SAFE" 638 and requires the user's passcode or fingerprint verification or any other identification method in order to confirm that user is safe.

FIGS. 6I and 6J are other exemplary application views of a safety application that can be executed in a device, for example, a smart phone.

If the user receives an alarm, a push notification may be provided on the application view indicating that "A is in trouble and needs your help" 642. The push notification may include two options: "I CAN'T MAKE IT" button 646 and "SEE A'S LOCATION/I'M ON MY WAY" button 644. If user taps the "I CAN'T MAKE IT" button 646, the application view returns to the regular map view. If the user taps the "SEE A'S LOCATION/I'M ON MY WAY" button 644, the application view enables route and navigation to guide the user to the alarm sender's location. The map shows the navigation, the shortest route and time-estimate to the sender's location. Other online users may not be visible on the map to the recipient during the alarm situation or only restricted information may be visible to alarm recipients. Safety points may be visible as custom map annotations.

The application may show in the map view the shortest distance and time-estimate to alarm sender's location 648. If the user taps and/or slides the "I'M ON MY WAY" button or slider 644, the application starts to navigate the user to the alarm sender's location. The map may show the shortest route to the sender's location according to a chosen method of transportation. The safety application may offer for the user a possibility to choose a transportation method from a set of transportation methods in various stages when using the application, either as an alarm recipient or as an alarm sender. The alarm recipient may also have access to the alarm sender's profile information including, for example, medical data relevant to the emergency.

The alarm recipient's information, for example, user identity, location data and a timestamp for the recipient's response/acknowledgement may be saved to a database.

Figure 6K:
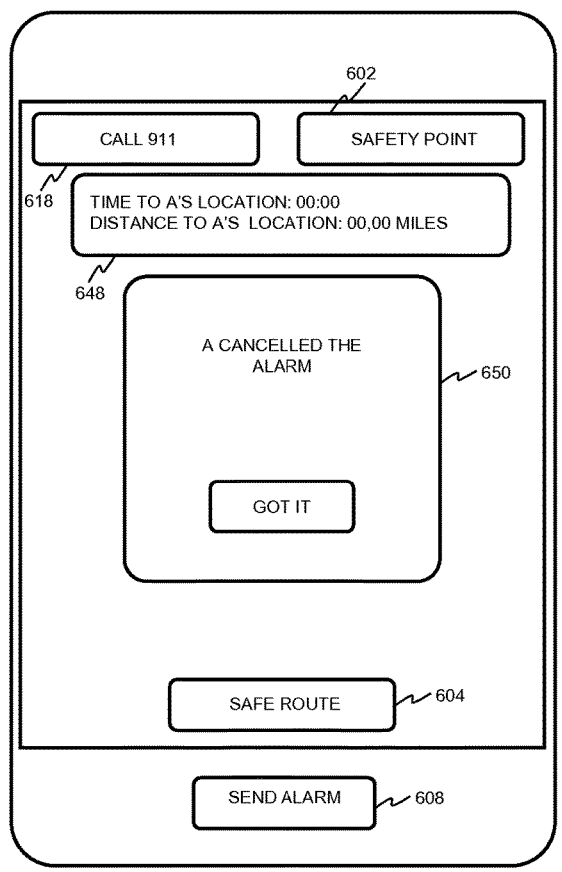
Figure 6L:
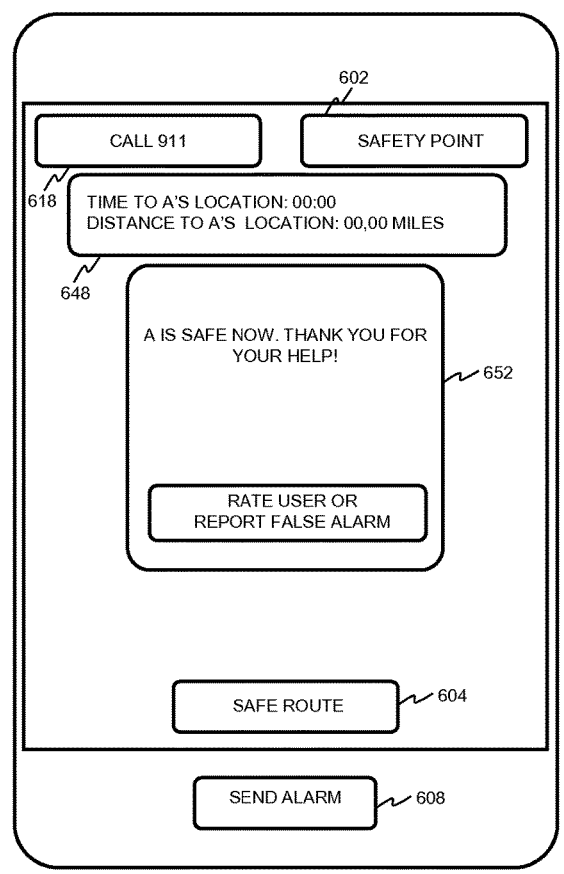

FIGS. 6K and 6L are other exemplary application views of a safety application that can be executed in a device, for example, a smart phone.

If the alarm sender cancels the alarm within cancel time, a push notification 650 may be provided to the alarm recipients. The user may need to tap "GOT IT" in order to get back to the main screen. The timestamp and location data for the cancellation may be saved to a database.

When the sender has cancelled the alarm or has confirmed that the sender is safe, the recipients may be automatically provided a push notification "A IS SAFE NOW. THANK YOU FOR YOUR HELP!" 652. The recipients may also tap the notification to rate the sender, other recipients or report false alarm. In another embodiment, the application may transmit automatically to a view where user can rate another user or report false alarm.

Figure 6M:
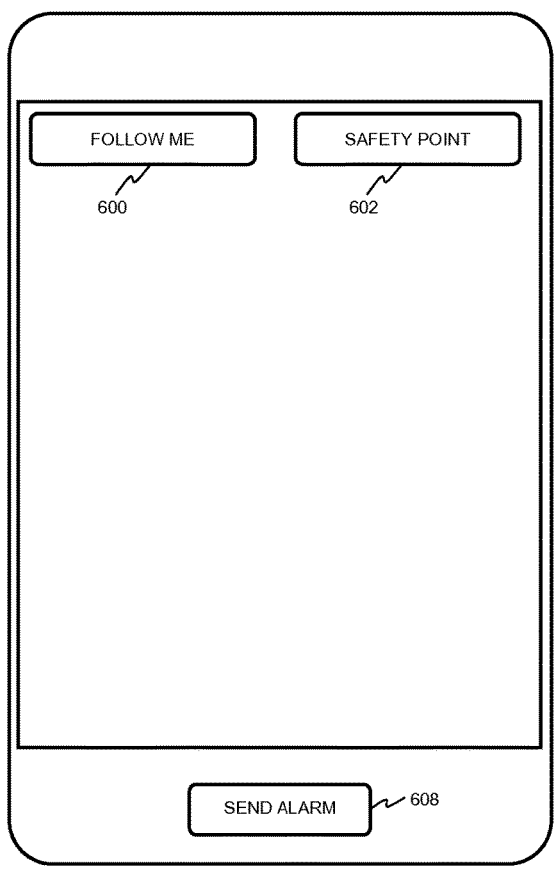

FIG. 6M is another exemplary application view of a safety application that can be executed in a device, for example, a smart phone.

The user can tap the "FOLLOW ME" button 600 to initiate a follow me feature.

Figure 6N:
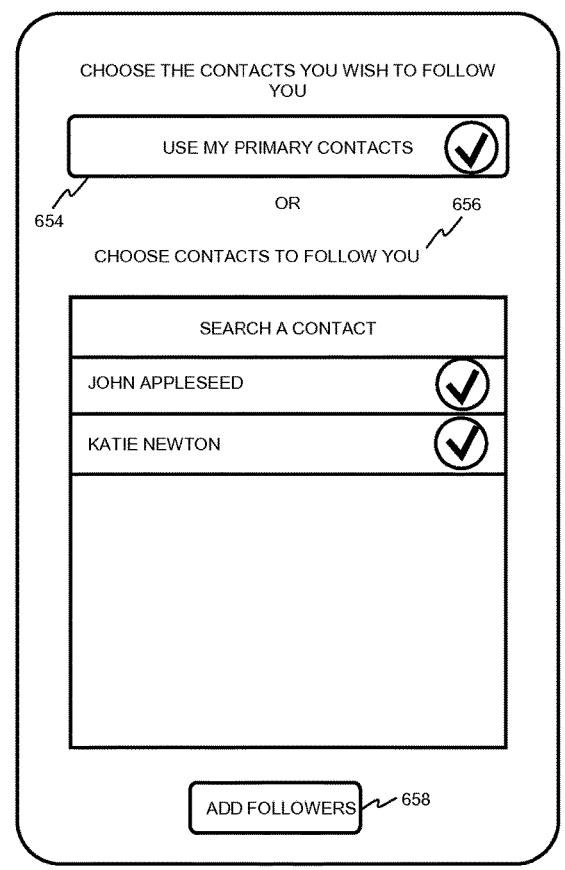

FIG. 6N is another exemplary application view of a safety application that can be executed in a device, for example, a smart phone.

The user can choose the user's primary contacts 654 or choose a certain amount of contacts from user's contact list 656. The user may also choose "Always use primary contacts" from application settings. When the user taps the "ADD FOLLOWERS" button 658, the application view screen proceeds to next screen, and these contacts will receive a request to follow user's location. The follow me request will be sent by notification between the applications in the user's device and the application in the recipient's device if the contacts have the same application. The request may be sent by some other form of message, for example, a short message if the contacts do not have the application. The message may include a link to the application, hyperlink, website link or any other link to user's location in real time and text "A requested you to follow her/him" or "A sent you a Follow me request. Tap to see A's location/Follow A".

Figure 6O:
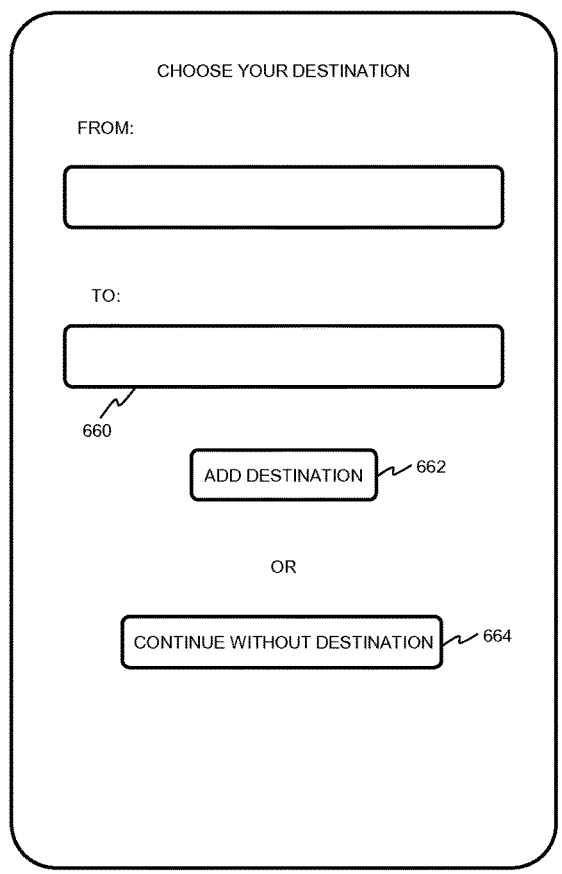

FIG. 6O is another exemplary application view of a safety application that can be executed in a device, for example, a smart phone.

The user may choose a destination 662 or continue without destination 664. The user may then tap the "ADD DESTINATION" button 662 OR "CONTINUE WITHOUT DESTINATION" button 664 and the application proceeds to the next view.

When the user initiates the follow me feature but does not give any specific destination, the safety application may, after a predetermined time, ask confirmation from the user that the user is now safe. The safety application may also periodically request confirmation from the user that the user is safe.

Figure 6P:
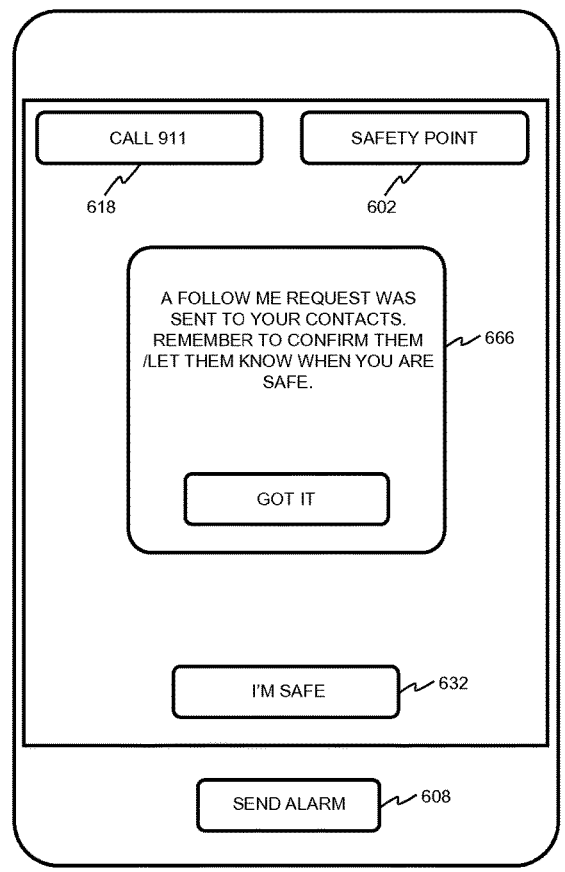

FIG. 6P is another exemplary application view of a safety application that can be executed in a device, for example, a smart phone.

When the user has chosen the follow me contacts/followers and has chosen whether to have a destination or not, the application view proceeds back to the map view. The application may show a push notification 666 to inform that the follow me request has now been sent. The user may need to tap the "GOT IT" button to get back to the map view. After user has tapped the "GOT IT" button the application shows the shortest and/or safest route, time-estimate and navigation to the chosen destination.

Information regarding the follow me request, for example, a timestamp and location relating to the request and the followers' user identity may be saved to a database.

In one embodiment, when the user selects "FOLLOW ME" button 600, the follow me request may be sent to a moving and/or a flying object of device. The object or device may thus be listed as one contact for the follow me request. If the follow me request is sent to the object or device, the object or device may then automatically follow the user and make sure that the user reaches his/her destination safely. In another embodiment, the user is able to assign an object or a device to follow another user. For example, a parent may assign an object or a device to follow his/her child. Any automatically, semi-automatically or manually operated device and/or object may be used.

Figure 6Q:
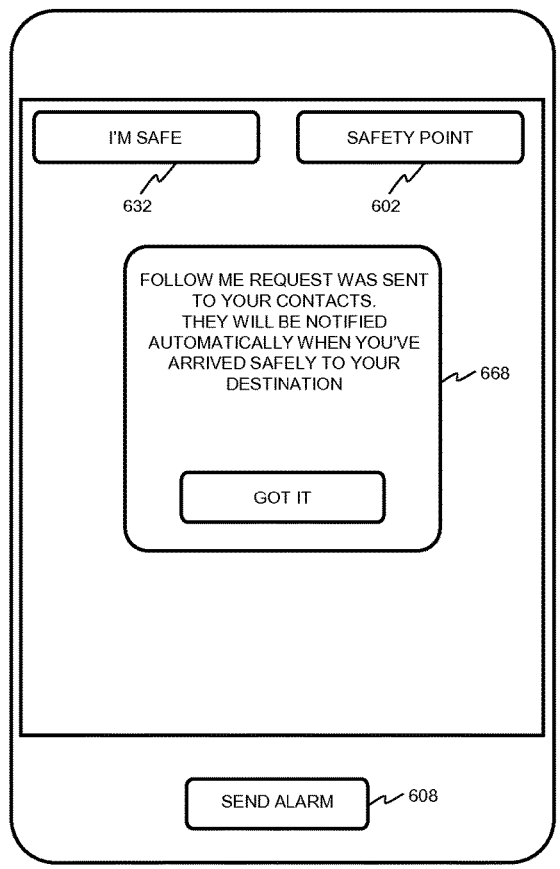
Figure 6R:
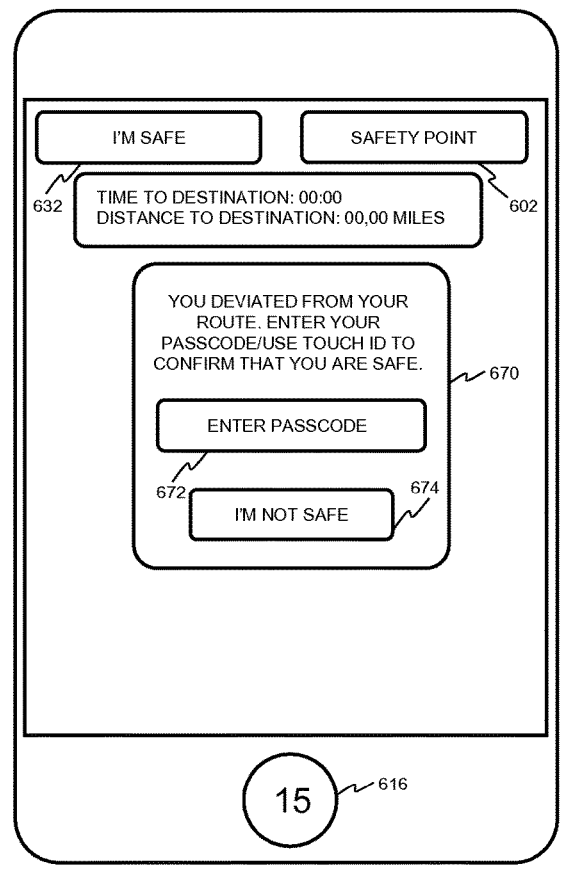

FIGS. 6Q and 6R are other exemplary application views of a safety application that can be executed in a device, for example, a smart phone.

The application may also provide a notification 668 to the user that the follow me request was sent to the user's contacts. After the user taps the "GOT IT" button, the application may show the shortest and/or safest route, time-estimate and navigation to the chosen destination. The chosen followers will automatically get a notification when user arrives to the given destination. For example, the application can recognize when user has arrived to the given destination or when the user leaves a specific location by using geo-fencing or other similar technological solution. The application may also ask the user to confirm that the user is safe, i.e. give a safety confirmation, when the user has arrived to the given destination. The application may also ask the user's passcode, fingerprint or any other identification method to verify that the user is now safe.

If user deviates from the specified route, the application may ask 670 the user to confirm that the user is still safe. If user enters the correct passcode 672 or fingerprint verification, for example, uses the Touch ID, the Follow me feature will continue normally and the application automatically calculates a new, safe route. If user taps "I'M NOT SAFE" button 674 or does not confirm that user is safe within a given time limit 616, for example, 15 seconds, an alarm is sent out. The location data and a timestamp for the alarm may be saved to a database.

Figure 6S:
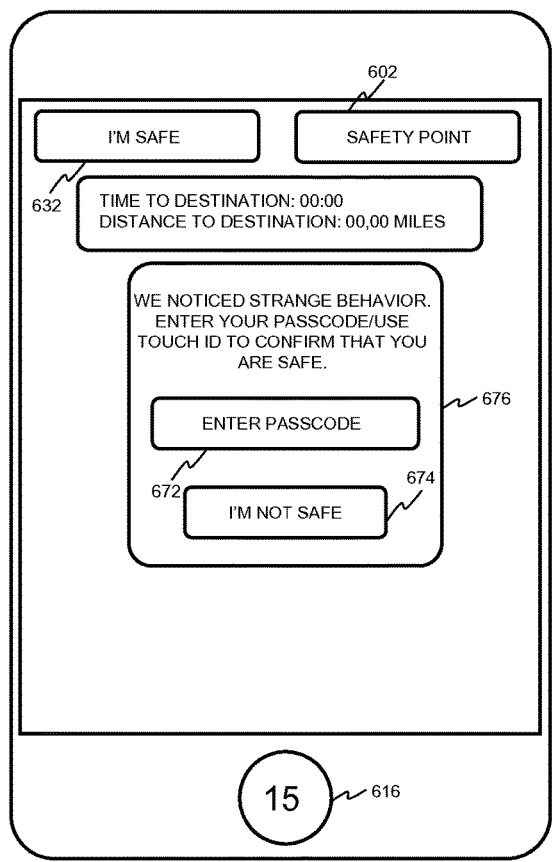
Figure 6T:
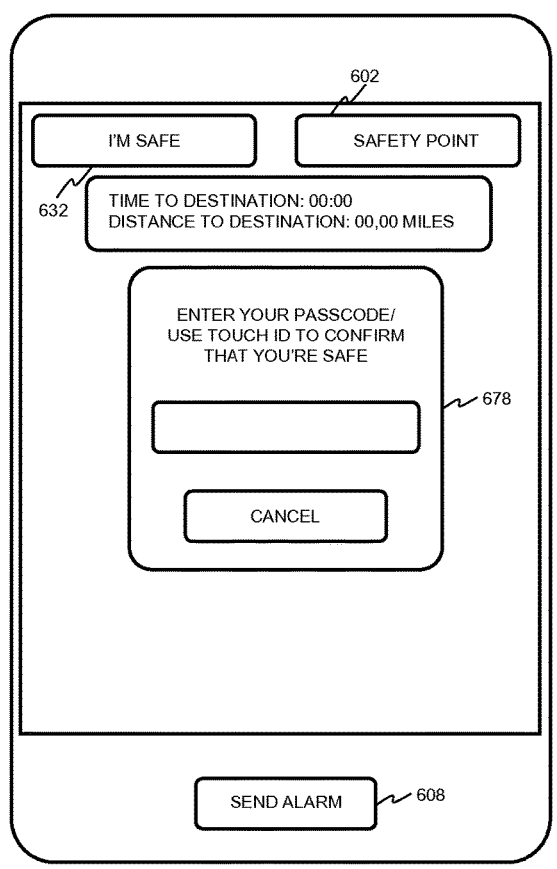

FIGS. 6S and 6T are other exemplary application views of a safety application that can be executed in a device, for example, a smart phone.

When application is in use or opened, for example Follow me, Safe route or Safety point features is initiated, and if the user, for example, starts to run, accelerates, stops for a certain period of time, misses the estimated time with a certain amount, falls or drops his/her phone, the headphones are plugged out, or the user's pulse rises or descends suddenly or over or below a certain threshold, the application may show a push notification 676 notifying the user about the identified strange behavior. If user taps "I'M NOT SAFE" 674 or does not confirm that the user is safe within a given time limit, for example, 15 seconds, an alarm is automatically sent out. Further, in general the safety application may detect any deviation from an expected behavior of the user, and initiate the alarm relating to the user either automatically or after first requesting a safety confirmation from the user and not receiving the confirmation, or receiving an indication from the user that the user is not safe. The deviation may, for example, refer to a deviation from an expected and/or predetermined route, acceleration or deceleration; a missed estimated time of arrival, an increase in the estimated time of arrival, distance to/from a predetermined location, detected strange, deviant or unexpected movement by the user, detected strange, deviant, unexpected movement by the user device or directed to the user device, immobility, and a variation in body function, such as an increase or a decrease in a pulse rate etc.

By taking into account the user's movements (for example leaving or arriving to a certain location) or user's unexpected, strange behavior by initiating automatic safety confirmation requests and/or other emergency communication, this enables efficiently and quickly initiating emergency communication, for example in situations when a user is prevented to initiate such communication through a user interface due to an emergency situation, making the emergency communication more efficient.

If user taps the "I'M SAFE" button 632 during the Follow me mode or before arriving to the given destination, the application shows a push notification 678 and requests the user to enter a passcode or use fingerprint verification/Touch ID to confirm that user is safe.

The location data and a timestamp for selecting "I'M SAFE" may be saved to the database.

FIG. 6U is another exemplary application view of a safety application that can be executed in a device, for example, a smart phone.

When the user has reached his/her destination, the application may provide a notification 680 to the user. Further, recipients or followers will get a push notification when user has arrived safely to his/her destination. The user may also send a message to the followers 682.

The location data and a timestamp that the user has arrived safely or confirmed that the user is safe may be saved to the database FIGS. 6V, 6W and 6X are other exemplary application views of a safety application that can be executed in a device, for example, a smart phone.

A recipient of a follow me request is provided with a push notification 683 that "A has requested you to follow him/her" or "A sent you a Follow me request". In response to the notification, the recipient can tap the "FOLLOW" button 684 or the "I CAN'T" button 685. If the user taps the "FOLLOW" button 684, the application view proceeds to the map view and displays the follow me request sender's location and possible route and time-estimate to sender's destination in real time on the map view. For example, the user identifiers of the followers/confirmed followers and timestamp for confirmations may be saved to the database.

In one embodiment, if the user receiving the follow me request cannot follow the sender of the request, the user may assign the follow me request to another contact. This contact may also have to be the sender's contact and the sender may have to approve or decline the assignment. The user receiving the follow me request may also see who else has accepted the request. If the user cannot follow the sender of the follow me request, the user may still be provided with a notification or any other form of message when the follow me request sender is safe.

The user receiving the follow me request may also see the location and route of the request sender in real time on the map view. Further, the user receiving the follow me request may also be able to see the time and distance for request sender to get to her/his destination. The user who has received and accepted a follow me request may also receive a notification if the request sender deviates from the originally specified route.

By selecting the "SEND MESSAGE TO A" button 686 the user is able to send messages to the followed user.

The application may provide a push notification 687 when the follow me request sender has arrived safely to his/her destination.

For example, the location data and a timestamp indicating that request sender has arrived safely to the given destination or confirmed that the user is safe may be saved to the database.

Figure 6Y:
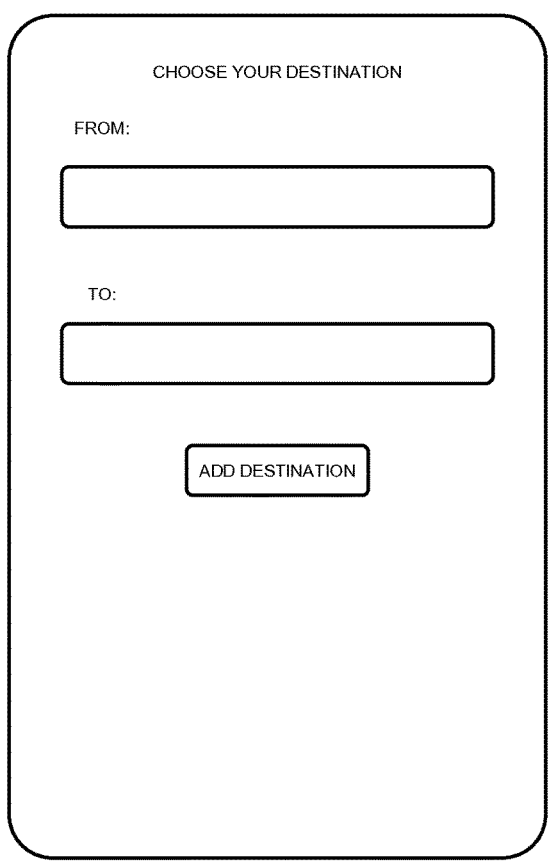
Figure 6Z:
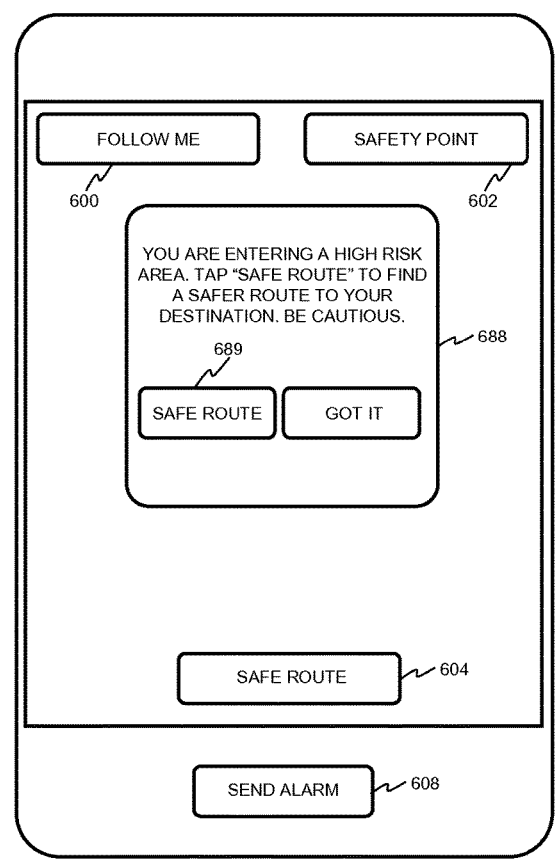
Figure 7:
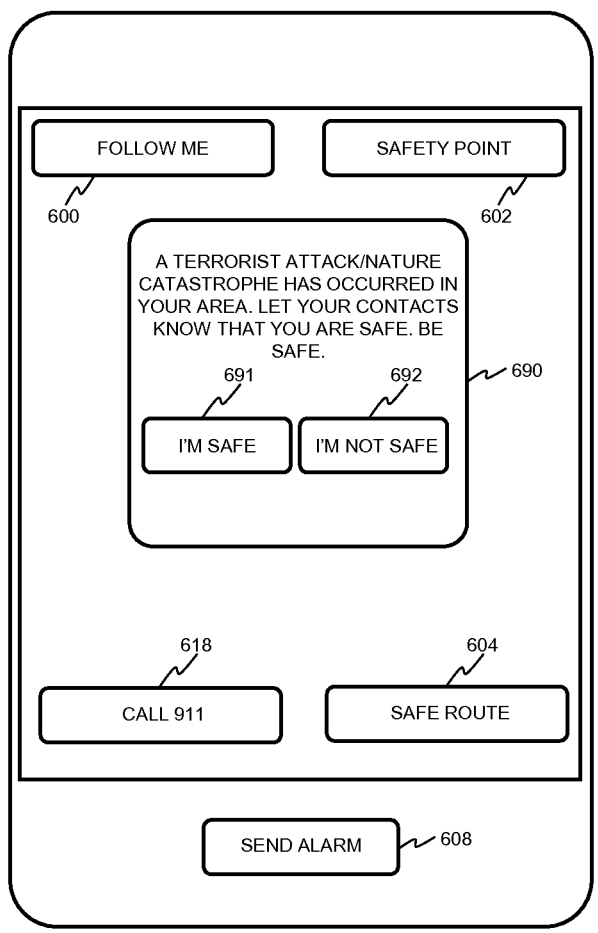
FIG. 7 is an other exemplary application view of a safety application that can be executed in a device, for example, a smart phone.

FIGS. 6Y, 6Z and 7 are other exemplary application views of a safety application that can be executed in a device, for example, a smart phone.

The user can choose a destination where the user wishes to go. The application proposes by default the safest and/or shortest route to the destination when the user is using the safety application for navigation. The choice of the safest route may be based on user reviews and official statistics, for example, authority and/or law enforcement and criminal statistics regarding high-criminality areas. The application may also use artificial intelligence and may be self-learning. The application learns where the user is frequently, in which areas and/or locations the user is moving frequently, which routes the user uses frequently and at what time. Then the application may react if necessary, send information or suggest automatically new routes, for example, safer routes, new areas or places/safety points to be saved as the user's preferred places/safety points.

The application may also provide to the user push notifications 688 when the user enters a high-risk area or an area with high criminality. For example, the application may inform the user "You are entering a high-risk area. Tap "Safe route" to find a safer route to your destination. Be cautious." When user taps the "SAFE ROUTE" button 689, a safer route may be determined with the application to the user.

When the user taps the "SAFE ROUTE" button 604 and provides a destination, the application will determine and show the shortest, safest route and navigation, and time and distance left to the chosen destination.

Further, the application may provide a push notification 690 when an emergency situation or an accident has occurred in the same area or nearby area as the user is currently located or has recently been logged in and located, for example, a terrorist attack, nature catastrophe, robbery, kidnap, any other crimes, accidents, emergencies etc. Further, users may themselves also provide reports and information through the application about, for example, emergencies, crimes, accidents etc. that have occurred recently.

The user may tap the "I'M SAFE" button 691 to confirm to their chosen contacts, primary contacts, and/or other users that the user is safe. Alternatively, the user may indicate a problematic situation by tapping the "I'M NOT SAFE" button 692. Further, it is also possible to share the safety check confirmation with user contact list and/or on the user's integrated social media accounts through the application.

In case an emergency situation occurs close to the user, the application may also provide a route and navigation instructions to a safer location or area and/or to the nearest safety point, for example, a police station or a hospital, away from the area where the accident or emergency has occurred. User may also receive news, updates and/or other information through the application regarding the occurred event through the application, for example in order to avoid certain areas.

Figure 8:
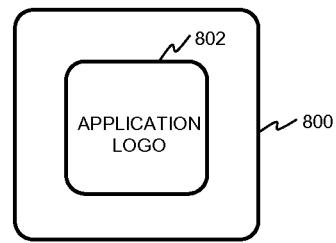
FIG. 8 is an exemplary application view of a safety application that can be executed in a device, for example, a smart watch.

FIG. 8 is an exemplary application view 800 of a safety application that can be executed in a device, for example, a smart watch. A user can also enable a "Power save screen" similar to the view in FIG. 8 so that the application only displays the alarm button or slider and menu button for example without a map interface, which saves battery of the user device.

An application logo 802 functions also as an alarm button. When a user pushes the alarm button for a certain time (for example for one second) or with certain force, the alarm may be sent to other users nearby and to the user's primary contacts, as illustrated above in various embodiments. When user pushes the alarm button, an animation, for example, a pressure wave animation may move towards the edges of the screen or the smart watch. The alarm button may have an animation that it pulses, for example, white light. If the safety application is connected or run through a smart watch or similar device that can detect user's pulse rate, the alarm button shall pulse in accordance with the user's pulse.

In one embodiment, the safety application uses geo-fencing. When the user starts from a certain safety point or arrived at a certain safety point or any other destination or area, the safety application may send a notification to primary contacts of the user and/or to other users. Further, if the user fails to reach a specific location/destination within an estimated time of arrival or if, for example, geo-fencing based check-in/check-out does not happen from a specific location within a predetermined time or within time learned by, for example, artificial intelligence, user's primary contacts or other users may be notified and/or an alarm may be automatically initiated. The artificial intelligence, or other self-learning algorithms, software or technology learns the user's behavior, where and when the user moves and other behavioral patterns relating to the user. This can be used to determine whether a safety confirmation id to be requested, contacts or other users are to be notified and/or an alarm is to be automatically initiated.

In one embodiment, geo-fencing or other corresponding technology may be used to automatically generate a signal indicating an emergency relating to a user and/or cause transmission of an emergency communication when the user reaches a certain location or area or leaves a certain location or area.

In one embodiment, the safety application, algorithm, or software may alternatively or additionally cause or facilitate transmission of an emergency communication to a user device or recipient with certaro training or experience.

In one embodiment, the safety application may cause or facilitate transmission of an emergency communication to a preferably closest safety authority or emergency authority or dispatcher.

In one embodiment, the safety application is connected to an external Bluetooth device, for example, a safety wristband, button or any other Bluetooth device. The safety device may be used to automatically initiate an alarm or a follow me procedure. For example, the external Bluetooth device may comprise a button, and one button push causes a follow me feature to be initiated, two button pushes causes an alarm to be sent and three pushes may cancel the alarm or provide a safety confirmation.

In one embodiment, the safety application may automatically send the latest location of the user to primary contacts of the user, followers and/or to recipients who have received an emergency communication from the user when the safety application is terminated, user cannot be located any more and/or when the battery of the user device runs out.

In one embodiment, any of the safety application buttons and/or sliders may be equipped with additional functionality. For example, the user may have to press a specific button or slide a specific slider long enough/for a certain time or with a certain force/sufficient pressure in order to initiate the action relating to the button or slider. For example, the 3D touch or force touch features of mobile or computing devices may be used here.

The safety application illustrated above may also enable transmitting textual or voice messages, for example, walkie-talkie type of messages where user for example taps and holds a contact's and/or other user's name, talks and when the user releases the contact's name or any other button, the voice message is sent to the contact. The message recipient will then receive a notification regarding the voice message, for example via a colored dot visible on the app (for example on the menu icon) and may be able to listen to the voice message for a certain amount of times and/or the message is available for a certain amount of time. The safety application may also enable communication via device-to-device communication. The textual or voice messages are not necessarily transmitted via a network connection but via neighboring devices. Further, in one embodiment, an indication about new messages may be shown in the safety application for example in connection with a menu icon.

Further, in one embodiment, the safety application may be able to use other user devices and safety applications in them as "base stations" without having to have an existing network connection, for example Internet connection. The connection between user devices may be established via local wireless connections, for example, Bluetooth, wireless local area network etc.

In one embodiment, the safety application comprises an "unwanted follower" indication feature. For example, it may happen that an unknown user that the application can track and/or otherwise see his/her position, may start to follow movements of the user, for example, via his/her safety application. Therefore, the user's safety application may provide an indication if someone else is following the user from a certain distance, for a certain period of time and/or for a certain distance.

In one embodiment, the user may be able to initiate an alarm even if the user is not actively using the safety application. For example, the user may be able to send an alarm from a locked device screen of the mobile device or by performing a specific action on an application icon relating to the safety application or via a widget, for example, sliding or tapping an application icon or a widget.

In one embodiment, the safety application may provide an alarm indication, for example a sound/voice indication, relating to another user or a primary contact to the user even if the mobile device's sounds are muted.

In one embodiment, it may be possible to send an alarm, cancel an alarm or to provide "I'M SAFE" confirmation via a locked screen of a mobile device, via a widget or selecting an application icon of the safety application, using certain pressure or force, for example, 3D touch or force touch features.

In one embodiment, when an alarm is initiated by the user of the safety application, the alarm is immediately transmitted away to appropriate recipients and the alarm becomes immediately visible in the recipient's device. Another possibility is that the safety application holds the sending of the alarm for a predetermined time (for example, for the duration of the cancel timer), and the alarm is transmitted further only when the predetermined time has elapsed. Yet another possibility is that the alarm is immediately transmitted to a server and/or to the recipient device but the alarm is not visible to the user of the recipient device until a predetermined time has elapsed, for example, the cancel timer has expired. The alarm may thus be blocked by the recipient device or by a safety application executed by the recipient device until a predetermined time has elapsed, for example, the cancel timer has expired. Thus, if the recipient device receives an indication that the alarm has been canceled within the cancel timer, the alarm will not be shown to the recipient at all. Yet another possibility is that the alarm is immediately transmitted to a server but the server keeps the alarm in its memory until predetermined time has elapsed, for example the cancel timer has expired. Only after the cancel timer has expired, the alarm is sent to the recipient device(s). Further, in one embodiment, when the alarm is sent to the recipient device, the alarm sender or the alarm sender's device may indicate that the recipient device or the safety application executed by the recipient device is to delay the display of the alarm to the recipient by a delay time amount. If the recipient does not receive an alarm cancellation indication from the alarm sender within the delay time amount, the alarm is displayed to the recipient. If the recipient receives the alarm cancellation indication from the alarm sender within the delay time amount, the alarm may not be displayed to the recipient.

Alternatively, or in addition, the functionality described herein can be performed, at least in part, by one or more hardware logic components. For example, and without limitation, illustrative types of hardware logic components that can be used include Field-programmable Gate Arrays (FPGAs), Program specific Integrated Circuits (ASICs), Program-specific Standard Products (ASSPs), System-on-a-chip systems (SOCs), Complex Programmable Logic Devices (CPLDs), Graphics Processing Units (CPUs).

The functions described herein performed by a controller may be performed by software in machine readable form on a tangible storage medium, for example, in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software can be suitable for execution on a parallel processor or a serial processor such that the method steps may be carried out in any suitable order, sequentially and/or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. A method for controlling an emergency communication, the method comprising:
    detecting, by at least one processing unit, a signal indicating an emergency relating to a user of a user device;
    searching, by the at least one processing unit, for valid recipients for an emergency communication relating to the emergency, a valid recipient being determined based at least one-online status of the recipient and/or the spatial and/or temporal distance between the user device and a recipient device of the valid recipient;
    selecting, by the at least one processing unit, at least one valid recipient found in the search;
    causing, by the at least one processing unit, transmission of the emergency communication to a recipient device corresponding to the at least one selected valid recipient; and
    directing the search to one of the following; all online recipients, online recipients with the most recent online timestamp, and/or online recipients having the most recent location within a predetermined spatial and/or temporal distance from the user device.

2. The method according to claim 1, further comprising: directing the search to one of the following: all offline recipients, offline recipients with the most recent online timestamp, and offline recipients having the most recent location within a predetermined spatial and/or temporal distance from the user device.

3. The method according to claim 1, further comprising: directing the search to offline recipients that are, according to a probability, most likely within a predetermined spatial and/or temporal distance from the user device, said probability being based on determined statistical or any other amount of online activity from a specific location or address.

4. The method according to claim 1, further comprising at least one of the following: continuously updating the search results; updating the search results after a search timer expires or after a certain time limit; updating the search results when a new valid recipient needs to be selected; and performing a single search in response to receiving the signal indicating the emergency, the search results of the single search comprises a predetermined number of valid recipients.

5. The method according to claim 1, further comprising: organizing, by the at least one processing unit, the at least one valid recipient found in the search according to the shortest spatial and/or temporal distance between the user device and the recipient device of each valid recipient; and selecting, by the at least one processing unit, the at least one valid recipient based on the organized search.

6. The method according to claim 1, further comprising: organizing, by the at least one processing unit, the at least one valid recipient found in the search according to at least online timestamp, most recent online timestamp and/or timestamp for location update; and selecting, by the at least one processing unit, the at least one valid recipient based on the organized search.

7. The method according to claim 1, further comprising: selecting a predetermined number of new valid recipients when a timer expires, after a certain time limit and/or when the number of arrived or acknowledged recipients has not reached a predetermined limit.

8. The method according to claim 1, further comprising: determining, by the at least one processing unit, that no acknowledgement has been received within a recipient specific acknowledgement time limit from a selected valid recipient to which the emergency communication was caused to be sent; optionally deselecting the previously selected valid recipient from which no acknowledgement has been received within a recipient specific acknowledgement time limit: selecting, by the at least one processing unit, a new valid recipient; and causing, by the at least one processing unit, transmission of the emergency communication to a recipient device corresponding to the selected new valid recipient.

9. The method according to claim 1, further comprising: determining, by the at least one processing unit, that a recipient device of a recipient is within a predetermined spatial and/or temporal distance from the user device; and excluding, by the at least one processing unit, the recipient from the search for and/or selection of valid recipients.

10. The method according to claim 1, further comprising: determining, by the at least one processing unit, at least one of the following: no new valid online recipients are available; a general timer started when the emergency communication was transmitted to a first selected valid recipient has expired or a certain time limit has expired; and the number of acknowledged and/or arrived recipients has not reached a predetermined limit; selecting at least one offline recipient; and causing transmission of the emergency communication to an offline recipient device corresponding to the at least one selected offline recipient.

11. The method according to claim 10, further comprising: organizing, by the at least one processing unit, the offline recipients found in the search according to the most recent online time stamp; and selecting, by the at least one processing unit, the at least one offline recipient based on the organized search.

12. The method according to claim 10, further comprising:
organizing, by the at least one processing unit, the offline recipients found in the search according to the spatial and/or temporal distance between the user device and the latest location of an offline recipient device of an offline recipient; and selecting, by the at least one processing unit, the at least one offline recipient based on the organized search, optionally at least the one with the shortest distance.

13. The method according to claim 1, further comprising: initiating, by the at least one processing unit, a canceling timer; providing, by the at least one processing unit, the canceling timer via a user interface to the user: and canceling, by the at least one processing unit, the emergency communication if receiving a cancel confirmation from the user before the canceling timer expires.

14. The method according to claim 1, further comprising: delaying, by the at least one processing unit, the transmission of the emergency communication to the recipient device corresponding to the at least one selected valid recipient by a delay time amount after receiving the signal indicating the emergency relating to the user of the user device; and causing, by the at least one processing unit, transmission of the emergency communication to the recipient device corresponding to the at least one selected valid recipient if receiving no cancel confirmation from the user during the delay time amount.

15. The method according to claim 1, further comprising: detecting, by the at least one processing unit, a deviation from an expected behavior of the user according to selected criterion; and initiating, by the at least one processing unit, the signal indicating the emergency relating to the user of the user device.

16. The method according to claim 15, further comprising: requesting, by the at least one processing unit, a confirmation from the user after detecting the deviation from the expected behavior of the user; and automatically initiating, by the at least one processing unit, the signal indicating the emergency relating to the user of the user device when receiving no confirmation from the user within a predetermined time limit.

17. The method according to claim 15, wherein the deviation from the expected behavior comprises at least one of the following: deviation from an expected and; or predetermined route; acceleration or deceleration; a missed estimated time of arrival; an increase in the estimated time of arrival; distance to/from a predetermined location; detected strange, deviant or unexpected movement by the user; detected strange, deviant, unexpected movement by the user device or directed to the user device; immobility;
and a variation in a body function, such as an increase or a decrease in a pulse rate.

18. The method according to claim 1, further comprising: detecting, by the at least one processing unit, an event concerning the location of the user of the user device; and requesting, by the at last one processing unit, a safety confirmation from the user after detecting the event.

19. The method according to claim 1, further comprising: requesting, by the at least one processing unit, a safety confirmation from the user of the user device when the user and/or a recipient and/or a contact reaches a predetermined location or departs from a predetermined location.

20. The method according to claim 18, further comprising: automatically initiating, by the at least one processing unit, the signal indicating the emergency relating to the user of the user device when receiving no confirmation from the user within a predetermined time limit.

21. The method according to claim 1, further comprising: causing transmission, by the at least one processing unit, of a safety confirmation when the user reaches a predetermined location or departs from a predetermined location.

22. A computer program product embodied in a computer-readable non-transitory medium, which when executed by an apparatus, causes the apparatus to detect a signal indicating an emergency relating to a user of a user device; search for valid recipients for an emergency communication relating to the emergency, a valid recipient being determined based at least on online status of the recipient and/or spatial and/or temporal distance between the user device and a recipient device of the valid recipient; select at least one valid recipient found in the search; and cause transmission of the emergency communication to a recipient device corresponding to the at least one selected valid recipient; and directing the search to one of the following: all online recipients, online recipients with the most recent online timestamp, and/or online recipients having the most recent location within a predetermined spatial and/or temporal distance from the user device.

23. An apparatus for controlling an emergency communication, the apparatus comprising: at least one processing unit; at least one memory; wherein the at least one memory stores program instructions that, when executed by the at least one processing unit, cause the apparatus to: detect a signal indicating an emergency relating to a user of a user device; search for valid recipients for an emergency communication relating to the emergency, a valid recipient being determined based at least on online status of the recipient and/or spatial and/or temporal distance between the user device and a recipient device of the valid recipient; select at least one valid recipient found in the search; and cause transmission of the emergency communication to a recipient device corresponding to the at least one selected valid recipient; and directing the search to one of the following: all online recipients, online recipients with the most recent online timestamp, and/or online recipients having the most recent location within a predetermined spatial and/or temporal distance from the user device.

* * * * *